(12) United States Patent
Vaka et al.

(10) Patent No.: US 12,411,712 B2
(45) Date of Patent: Sep. 9, 2025

(54) PREDICTABLE AND ADAPTIVE QUALITY OF SERVICE FOR STORAGE

(71) Applicant: Microsoft Technology Licensing, LLC, Redmond, WA (US)

(72) Inventors: Pratapa Reddy Vaka, Saratoga, CA (US); Pradeep Sindhu, Los Altos Hills, CA (US); Jaspal Kohli, Sunnyvale, CA (US); Srihari Raju Vegesna, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 602 days.

(21) Appl. No.: 17/457,230

(22) Filed: Dec. 1, 2021

(65) Prior Publication Data

US 2023/0168934 A1 Jun. 1, 2023

(51) Int. Cl.
*G06F 9/50* (2006.01)
*G06F 9/48* (2006.01)
*H04L 67/1097* (2022.01)

(52) U.S. Cl.
CPC .......... *G06F 9/5022* (2013.01); *G06F 9/4881* (2013.01); *H04L 67/1097* (2013.01); *G06F 2209/505* (2013.01)

(58) Field of Classification Search
CPC ................. G06F 9/5022; G06F 9/4881; G06F 2209/505; G06F 2209/5016; H04L 67/1097
See application file for complete search history.

(56) References Cited

U.S. PATENT DOCUMENTS

| | | | |
|---|---|---|---|
| 9,176,708 B2 | 11/2015 | Gallant et al. | |
| 9,515,956 B2 | 12/2016 | Hu et al. | |
| 10,481,801 B1 | 11/2019 | Baitule et al. | |
| 10,540,288 B2 | 1/2020 | Noureddine et al. | |
| 10,565,112 B2 | 2/2020 | Noureddine et al. | |
| 10,574,579 B2 | 2/2020 | Puttagunta et al. | |
| 10,659,254 B2 | 5/2020 | Sindhu et al. | |
| 10,686,729 B2 | 6/2020 | Sindhu et al. | |
| 10,841,245 B2 | 11/2020 | Gray et al. | |
| 10,929,175 B2 | 2/2021 | Goyal et al. | |

(Continued)

OTHER PUBLICATIONS

U.S. Appl. No. 17/454,731, filed Nov. 12, 2021, naming inventors Goel et al.

*Primary Examiner* — Tuan C Dao
(74) *Attorney, Agent, or Firm* — Alleman Hall & Tuttle LLP

(57) ABSTRACT

This disclosure describes a set of techniques that include establishing and managing quality of service standards across storage cluster resources in a data center. In one example, this disclosure describes a method that includes establishing a quality of service standard for a tenant sharing a storage resource with a plurality of tenants, wherein the storage resource is provided by the plurality of storage nodes in the storage cluster; allocating a volume of storage within the storage cluster, wherein allocating the volume of storage includes identifying a set of storage nodes to provide the storage resource for the volume of storage, and wherein the set of storage nodes are a subset of the plurality of storage nodes; and scheduling operations to be performed by the set of storage nodes for the volume of storage.

18 Claims, 9 Drawing Sheets

(56) References Cited

U.S. PATENT DOCUMENTS

| | | |
|---|---|---|
| 11,048,634 B2 | 6/2021 | Noureddine et al. |
| 11,178,262 B2 | 11/2021 | Goel et al. |
| 2003/0079018 A1* | 4/2003 | Lolayekar ............... G06F 3/067 |
| | | 709/239 |
| 2003/0079019 A1* | 4/2003 | Lolayekar ............ H04L 67/101 |
| | | 709/226 |
| 2003/0191857 A1* | 10/2003 | Terrell .................... H04L 49/90 |
| | | 709/244 |
| 2003/0223445 A1* | 12/2003 | Lodha .................... H04L 47/10 |
| | | 370/428 |
| 2004/0133622 A1* | 7/2004 | Clubb ................... G06F 9/5077 |
| | | 709/200 |
| 2004/0193827 A1* | 9/2004 | Mogi ................. G06F 11/3433 |
| | | 711/170 |
| 2005/0235072 A1* | 10/2005 | Smith .................... G06F 13/28 |
| | | 710/22 |
| 2006/0106749 A1* | 5/2006 | Ganfield ............. G06F 16/9024 |
| 2007/0015525 A1* | 1/2007 | Beming .................. H04L 47/83 |
| | | 370/235 |
| 2010/0131957 A1* | 5/2010 | Kami .................... G06F 9/5077 |
| | | 718/104 |
| 2012/0317358 A1* | 12/2012 | Ando ...................... G06F 3/067 |
| | | 711/E12.002 |
| 2014/0337577 A1* | 11/2014 | Burton ................. G06F 3/0631 |
| | | 711/114 |
| 2019/0108231 A1* | 4/2019 | Patterson ............ G06F 11/1464 |
| 2019/0236150 A1* | 8/2019 | Zaslavsky ........... G06F 16/2308 |
| 2020/0167097 A1 | 5/2020 | Huen et al. |
| 2020/0183841 A1 | 6/2020 | Noureddine et al. |
| 2020/0280462 A1 | 9/2020 | Sindhu et al. |
| 2020/0314026 A1 | 10/2020 | Sindhu et al. |
| 2021/0349824 A1 | 11/2021 | Noureddine et al. |

* cited by examiner

PREDICTABLE AND ADAPTIVE QUALITY OF SERVICE FOR STORAGE

TECHNICAL FIELD

This disclosure relates to sharing resources in the fields of networking and data storage.

BACKGROUND

With advances in data center fabric technology, storage capacity, and networking speeds, storage systems in data centers are evolving. A storage cluster is a system enabling efficient storage of data within a data center or across data centers, and enabling access to such data to customers or tenants of a data center that share the resources of the storage cluster. Because there might be many tenants sharing resources of a data center, customer service level agreements (SLAs) are sometimes used to establish quality of service (QoS) standards. Such standards may help ensure not only that each tenant receives an expected or agreed-upon level of service, but such standards may also reduce adverse effects of noisy neighbor tenants in a data center that might disrupt other tenants' use of the data center.

SUMMARY

This disclosure describes techniques that include establishing and managing quality of service (QoS) standards across storage cluster resources in a data center. In some examples, such techniques may involve establishing quality of service standards for customers, tenants, and/or operations across multiple storage cluster resources and/or multiple computing systems. To effectively manage such QoS standards, an orchestration system within the storage cluster may allocate, in a hierarchical way, storage cluster resources. Further, computing devices or computing nodes within the storage cluster may collectively schedule operations to be performed using the resources within the storage cluster. Scheduling operations may involve applying an algorithm that seeks to ensure a guaranteed availability of resources associated with a given storage unit (e.g., a "volume" of storage) within the storage cluster and also a maximum availability of resources associated with the storage unit. Such guaranteed and maximum levels of service may apply to multiple types of resources (e.g., storage capacity, processing cycles, bandwidth, and others) as well as to multiple operations associated with a resource (e.g., read and write operations).

Techniques described herein may provide certain technical advantages. For instance, by taking QoS standards into account when allocating storage cluster resources, dynamically moving storage units (e.g., volumes) when needed, and limiting (e.g., rate limiting) use of resources within the storage cluster, it is possible to efficiently use a diverse set of resources that perform multiple types of operations across the storage cluster.

In some examples, this disclosure describes operations performed by a compute node, storage node, computing system, network device, and/or storage cluster in accordance with one or more aspects of this disclosure. In one specific example, this disclosure describes a method comprising establishing, by a storage cluster having a plurality of storage nodes, a quality of service standard for a tenant sharing a storage resource with a plurality of tenants, wherein the quality of service standard includes a guaranteed allocation of the storage resource for the tenant and a maximum allocation of the storage resource for the tenant, and wherein the storage resource is provided by the plurality of storage nodes in the storage cluster; allocating, by the storage cluster and based on the quality of service standard, a volume of storage within the storage cluster, wherein allocating the volume of storage includes identifying a set of storage nodes to provide the storage resource for the volume of storage, and wherein the set of storage nodes are a subset of the plurality of storage nodes; and scheduling, by the storage cluster and based on the quality of service standard, operations to be performed by the set of storage nodes for the volume of storage.

In another example, this disclosure describes a storage cluster comprising: a network; and a plurality of computing systems, each interconnected over the network and including a plurality of storage nodes, wherein the plurality of computing systems are collectively configured to: establish a quality of service standard for a tenant sharing a storage resource with a plurality of tenants, wherein the quality of service standard includes a guaranteed allocation of the storage resource for the tenant and a maximum allocation of the storage resource for the tenant, and wherein the storage resource is provided by the plurality of storage nodes in the storage cluster, allocate, based on the quality of service standard, a volume of storage within the storage cluster, wherein allocating the volume of storage includes identifying a set of storage nodes to provide the storage resource for the volume of storage, and wherein the set of storage nodes are a subset of the plurality of storage nodes, and schedule, based on the quality of service standard, operations to be performed by the set of storage nodes for the volume of storage.

In another example, this disclosure describes a storage cluster comprising processing circuitry and a system for storing computing instructions, wherein the processing circuitry has access to the system for storing computing instructions and is configured to: establish a quality of service standard for a tenant sharing a storage resource with a plurality of tenants, wherein the quality of service standard includes a guaranteed allocation of the storage resource for the tenant and a maximum allocation of the storage resource for the tenant, and wherein the storage resource is provided by the plurality of storage nodes in the storage cluster, allocate, based on the quality of service standard, a volume of storage within the storage cluster, wherein allocating the volume of storage includes identifying a set of storage nodes to provide the storage resource for the volume of storage, and wherein the set of storage nodes are a subset of the plurality of storage nodes, and schedule, based on the quality of service standard, operations to be performed by the set of storage nodes for the volume of storage.

DETAILED DESCRIPTION

Figure 1A:
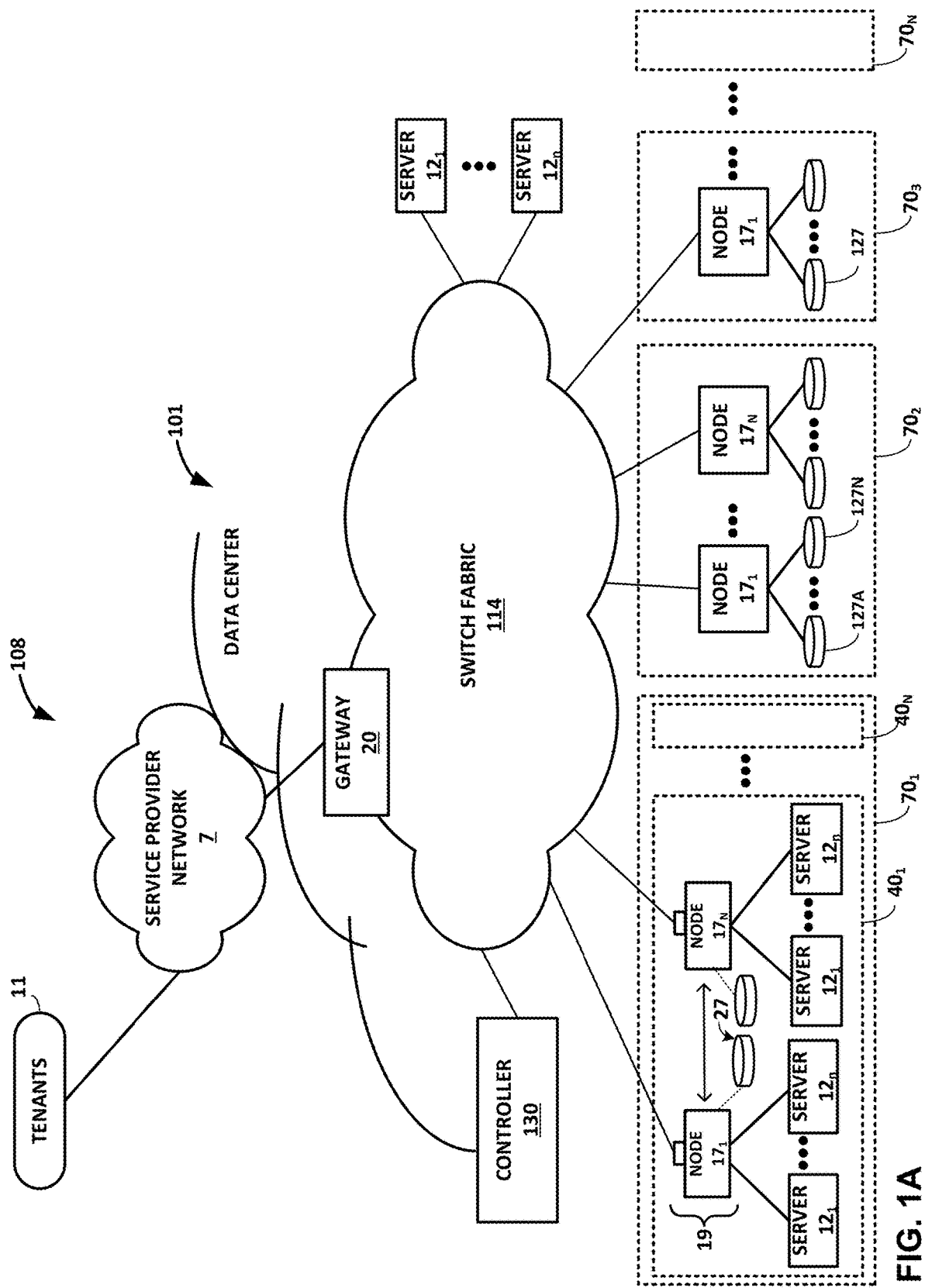
FIG. 1A is a block diagram illustrating an example system including one or more network devices configured to efficiently process and store data reliably in a storage cluster, in accordance with one or more aspects of the present disclosure.

FIG. 1A is a block diagram illustrating an example system 108 including one or more network devices configured to efficiently process and store data reliably in a storage cluster, in accordance with one or more aspects of the present disclosure. System 108 may include or represent a data center capable of performing data storage operations pursuant to quality of service (QoS) standards and/or service level agreements. Techniques described herein may enable efficient and effective compliance with such standards and/or agreements. Nodes as described herein may also be referred to as data processing units (DPUs) or devices including DPUs. For example, in FIG. 1A, various processing techniques are performed by nodes 17 within data center 101. Other devices within a network, such as routers, switches, servers, firewalls, gateways and the like, may readily be configured to utilize the data processing techniques described herein.

Data center 101 represents an example of a system in which various techniques described herein may be implemented. In general, data center 101 provides an operating environment for applications and services for tenants or customers 11 coupled to the data center 101 by service provider network 7 and gateway device 20. Data center 101 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet.

In some examples, data center 101 may represent one of many geographically distributed network data centers. In the example of FIG. 1A, data center 101 is a facility that provides information services for tenants 11. Tenants or customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

Controller 130, shown included within data center 101 of FIG. 1A, may be one or more computing devices that manage aspects of how data center 101 is configured and/or operates. In some examples, controller 130 may operate as a high-level controller or may serve as a software-defined networking (SDN) controller that configures and manages the routing and switching infrastructure of data center 101. In such an example, controller 130 may provide a logically (and in some cases physically) centralized controller for facilitating operation of one or more virtual networks within data center 101. Controller 130 may operate on its own, or in response to signals received from an administrator device (not shown) operated by an administrator. Controller 130 may offer application programming interface ("API") support for various cluster services, which may include orchestration, storage services, and/or storage management capabilities. Such capabilities may also include infrastructure discovery, registration, and initialization, role-based access control, multi-tenancy and resource partitioning, application workload deployment and orchestration, flexible network control, identity management, and hardware lifecycle management and monitoring.

Controller 130 may also be responsible for allocating and accounting for resources for a "volume," which may, in some examples, refer to a basic storage unit abstraction supported by a data center or a storage cluster within a data center. In such an example, a volume may be a storage container divided into fixed size blocks, and be capable of being allocated and deallocated by controller 130, as well as being written to and read from by nodes or other devices within the data center.

In the illustrated example, data center 101 includes a set of storage systems and application servers 12 interconnected via a high-speed switch fabric 114. In some examples, servers 12 are arranged into multiple different server groups, each including any number of servers up to, for example, n servers $12_1$-$12N$. Servers 12 provide computation and storage facilities for applications and data associated with tenants or customers 11 and may be physical (bare-metal) servers, virtual machines running on physical servers, virtualized containers running on physical servers, or combinations thereof.

In the example of FIG. 1A, some of servers 12 may be coupled to switch fabric 114 by one or more nodes 17 for processing streams of information, such as network packets or storage packets. In example implementations, nodes 17 may be configurable to operate in a standalone network appliance having one or more nodes. For example, nodes 17 may be arranged into multiple different node groups 19, each including any number of nodes up to, for example, "N" nodes $17_1$-$17_N$ (representing any number of nodes 17). In other examples, each node may be implemented as a component (e.g., electronic chip) within a device, such as a compute node, application server, storage server, and may be deployed on a motherboard of the device or within a removable card, such as a storage and/or network interface card.

In the example shown in FIG. 1A, some nodes 17 are shown connected to one or more servers 12, and such nodes 17 may serve to offload (from servers 12) aspects of the handling of data packets and other network-related functions. These nodes are shown logically or physically organized within node groups 19, units 40, and racks 70. Specifically, rack 70-1 includes one or more node groups 19, each including a set of nodes 17 and storage devices 127. The node group and the set of servers 12 supported by the nodes 17 of the node group 19 may be referred to herein as a network storage compute unit (NCSU) 40. Illustrated in FIG. 1A are NCSU 40-1 through NCSU 40-N, which represent any number of NCSUs. (For ease of illustration, only components of NCSU 40-1 are shown.) In some examples, data center 101 may include many NCSUs, and multiple NCSUs 40 may be organized into logical racks or physical racks within data center 101. For example, in some implementations, two NCSUs may compose a logical rack, and four NCSUs may compose a physical rack 70-1. Other arrangements are possible. Such other arrangements may include nodes 17 within rack 70-1 being relatively independent, and not logically or physically included within any node group or NCSUs 40.

In general, each node group 19 of rack 70-1 may be configured to operate as a high-performance I/O hub designed to aggregate and process network and/or storage I/O for multiple servers 12. As mentioned above, the set of nodes 17 within each of the node groups 19 provide programmable, specialized I/O processing circuits for handling networking and communications operations on behalf of servers 12. In addition, in some examples, each of node groups 19 may include storage devices 127, such as solid state drives (SSDs) and/or hard disk drives (HDDs), configured to provide network accessible storage for use by applications executing on the servers 12. In some examples, one or more of the SSDs may comprise non-volatile memory (NVM) or flash memory. Although illustrated as logically within node groups 19 and external to nodes 17, storage devices may alternatively or in addition be included within one or more nodes 17 or within one or more servers 12.

Other nodes 17 may serve as storage nodes ("storage targets") that might not be directly connected to any of servers 12. For instance, FIG. 1A illustrates rack 70-2, which includes nodes 17-1 through 17-N (representing any number of nodes 17). These nodes 17 may be configured to store data within one or more storage devices 127 (included within or connected to such nodes 17) in accordance with techniques described herein. In the example illustrated, nodes 17 within rack 70-2 are not organized into groups or units, but instead, are relatively independent of each other, and are each capable of performing storage functions described herein. In other examples, however, nodes 17 of rack 70-2 may be logically or physically organized into groups, units, and/or logical racks as appropriate.

Rack 70-3 is illustrated as being implemented in a manner similar to rack 70-2, with storage nodes 17 configured to store data within storage devices. Although for ease of illustration, only racks 70-1, 70-2, 70-3, through 70-N are illustrated or represented in FIG. 1A, any number of racks 70 may be included within data center 101. Further, although rack 70-1 in FIG. 1A is illustrated with nodes 17 that support servers 12 and other racks 70 are illustrated with nodes 17 serving as storage nodes, in other examples, any number of racks may include nodes 17 that support servers 12, and any number of racks may include nodes serving as storage nodes. Further, any of racks 70 may include a mix of nodes 17 supporting servers 12 and nodes 17 serving as storage nodes. Still further, although data center 101 is illustrated in the context of nodes 17 being arranged within racks 70, other logical or physical arrangements of nodes 17 may be used in other implementations, and such other implementation may involve groups, units, or other logical or physical arrangements not involving racks.

Nodes 17 of rack 70-2 (or rack 70-3) may be devices or systems that are the same as or similar to nodes 17 of rack 70-1. In other examples, nodes 17 of rack 70-2 may have different capabilities than those of rack 70-1 and/or may be implemented differently. In particular, nodes 17 of rack 70-2 may be somewhat more capable than nodes 17 of rack 70-1, and may have more computing power, more memory capacity, more storage capacity, and/or additional capabilities. For instance, each of nodes 17 of rack 70-2 may be implemented by using a pair of nodes 17 of rack 70-1. To reflect such an example, nodes 17 of rack 70-2 and 70-3 are illustrated in FIG. 1A as being larger than nodes 17 of rack 70-1.

In a large scale fabric, storage systems (e.g., represented by nodes 17 of rack 70-2 or even NCSUs 40 of rack 70-1) may become unavailable from time to time. Failure rates of storage systems are often significant, even if single component failure rates are quite small. Further, storage systems may become unavailable for reasons other than a software error or hardware malfunction, such as when a storage system or other device is being maintained or the software on such a device is being modified or upgraded. Data durability procedures may be employed to ensure access to critical data stored on a network when one or more storage systems are unavailable.

In some examples, one or more hardware or software subsystems may serve as a failure domain or fault domain for storing data across data center 101. For instance, in some examples, a failure domain may be chosen to include hardware or software subsystems within data center 101 that are relatively independent, such that a failure (or unavailability) of one such subsystem is relatively unlikely to be correlated with a failure of another such subsystem. Storing data fragments in different failure domains may therefore reduce the likelihood that more than one data fragment will be lost or unavailable at the same time. In some examples, a failure domain may be chosen at the node level, where each node represents a different failure domain. In another example, a failure domain may be chosen at a logical or physical grouping level, such that each group or unit of nodes 17 represents a different failure domain. In other examples, failure domains may be chosen more broadly, so that a failure domain encompasses a logical or physical rack 70 comprising many nodes 17. Broader or narrower definitions of a failure domain may also be appropriate in various examples, depending on the nature of the network 8, data center 101, or subsystems within data center 101.

As further described herein, in one example, each node 17 may be a highly programmable I/O processor specially designed for performing storage functions and/or for offloading certain functions from servers 12. In one example, each node 17 includes a number of internal processor clusters, each including two or more processing cores and equipped with hardware engines that offload cryptographic functions, compression and regular expression processing, data durability functions, data storage functions and networking operations. In such an example, each node 17 may include components for processing and storing network data (e.g., nodes 17 of rack 70-2) and/or for and processing network data on behalf of one or more servers 12 (e.g., nodes 17 of rack 70-1). In addition, some or all of nodes 17 may be programmatically configured to serve as a security gateway for its respective servers 12, freeing up other computing devices (e.g., the processors of the servers 12) to dedicate resources to application workloads.

In various example implementations, some nodes 17 may be viewed as network interface subsystems that serve as a data storage node configured to store data across storage devices 127. Other nodes 17 in such implementations may be viewed as performing full offload of the handling of data packets (with, in some examples, zero copy in server memory) and various data processing acceleration for the attached server systems.

In one example, each node 17 may be implemented as one or more application-specific integrated circuit (ASIC) or other hardware and software components, each supporting a subset of storage devices 127 or a subset of servers 12. In accordance with the techniques of this disclosure, any or all of nodes 17 may include a data durability module or unit, which may be implemented as a dedicated module or unit for efficiently and/or quickly performing data durability operations. In some examples, such a module or unit may be referred to as an "accelerator" unit. That is, one or more computing devices may include a node including one or more data durability, data reliability, and/or erasure coding accelerator units.

In the example of FIG. 1A, each node 17 provides storage services (e.g., nodes 17 of rack 70-2) or connectivity to switch fabric 114 for a different group of servers 12 (e.g., nodes 17 of rack 70-1). Each of nodes 17 may be assigned respective IP addresses and provide routing operations for servers or storage devices coupled thereto. Nodes 17 may interface with and utilize switch fabric 114 so as to provide full mesh (any-to-any) interconnectivity such that any nodes 17 (or servers 12) may communicate packet data for a given packet flow to any node 17 using any of a number of parallel data paths within the data center 101. In addition, nodes 17 described herein may provide additional services, such as security (e.g., encryption), acceleration (e.g., compression), data reliability (e.g., erasure coding), I/O offloading, and the like. In some examples, each of nodes 17 may include or have access to storage devices, such as high-speed solid-state drives or rotating hard drives, configured to provide network accessible storage for use by applications executing on the servers. More details on the data center network architecture and interconnected nodes illustrated in FIG. 1A are available in U.S. Pat. No. 10,686,729, entitled "Non-Blocking Any-to-Any Data Center Network with Packet Spraying Over Multiple Alternate Data Paths," the entire content of which is incorporated herein by reference.

Figure 2A:
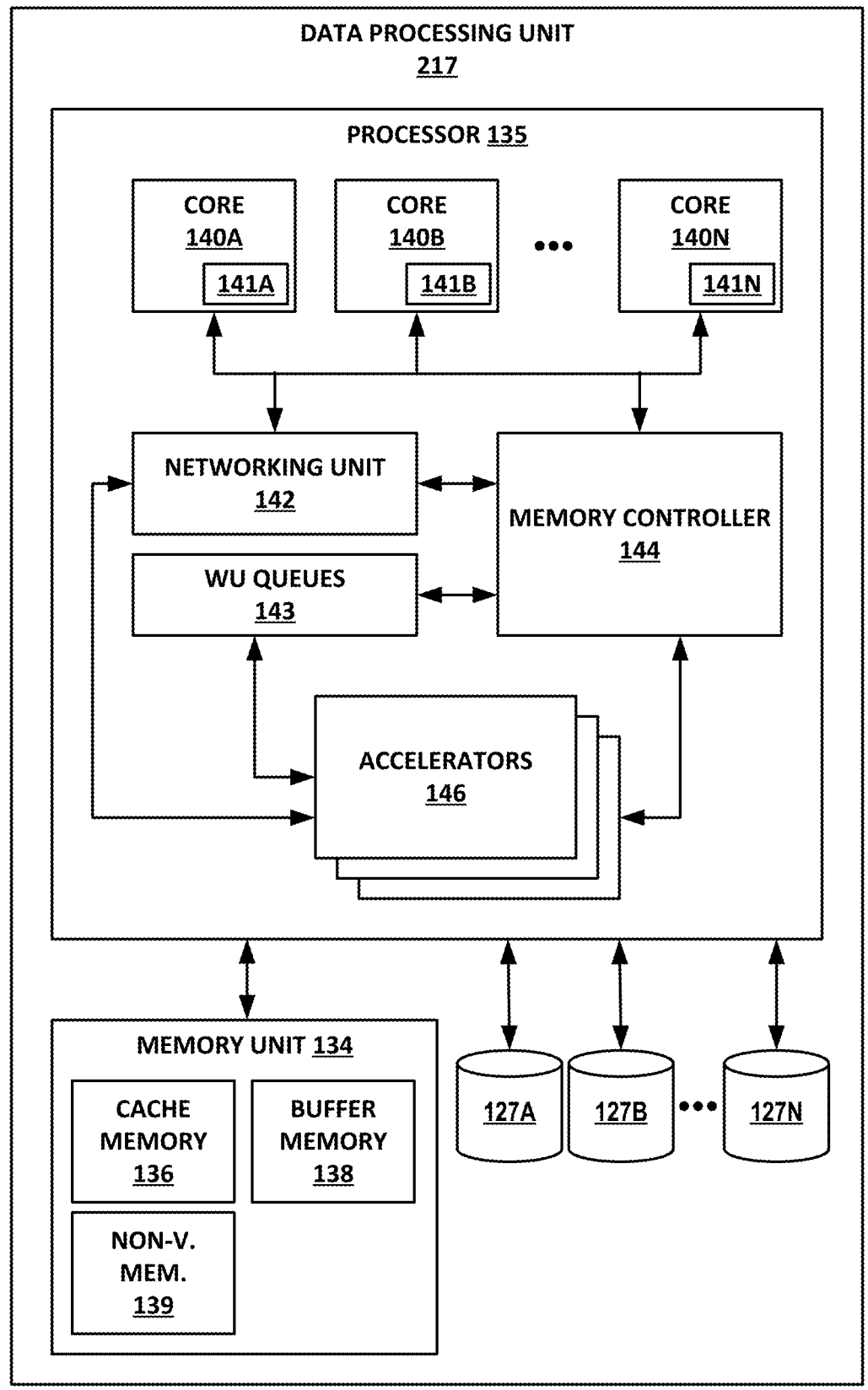
FIG. 2A is a block diagram illustrating an example node or data processing unit (DPU), in accordance with the techniques of this disclosure.
Figure 3:
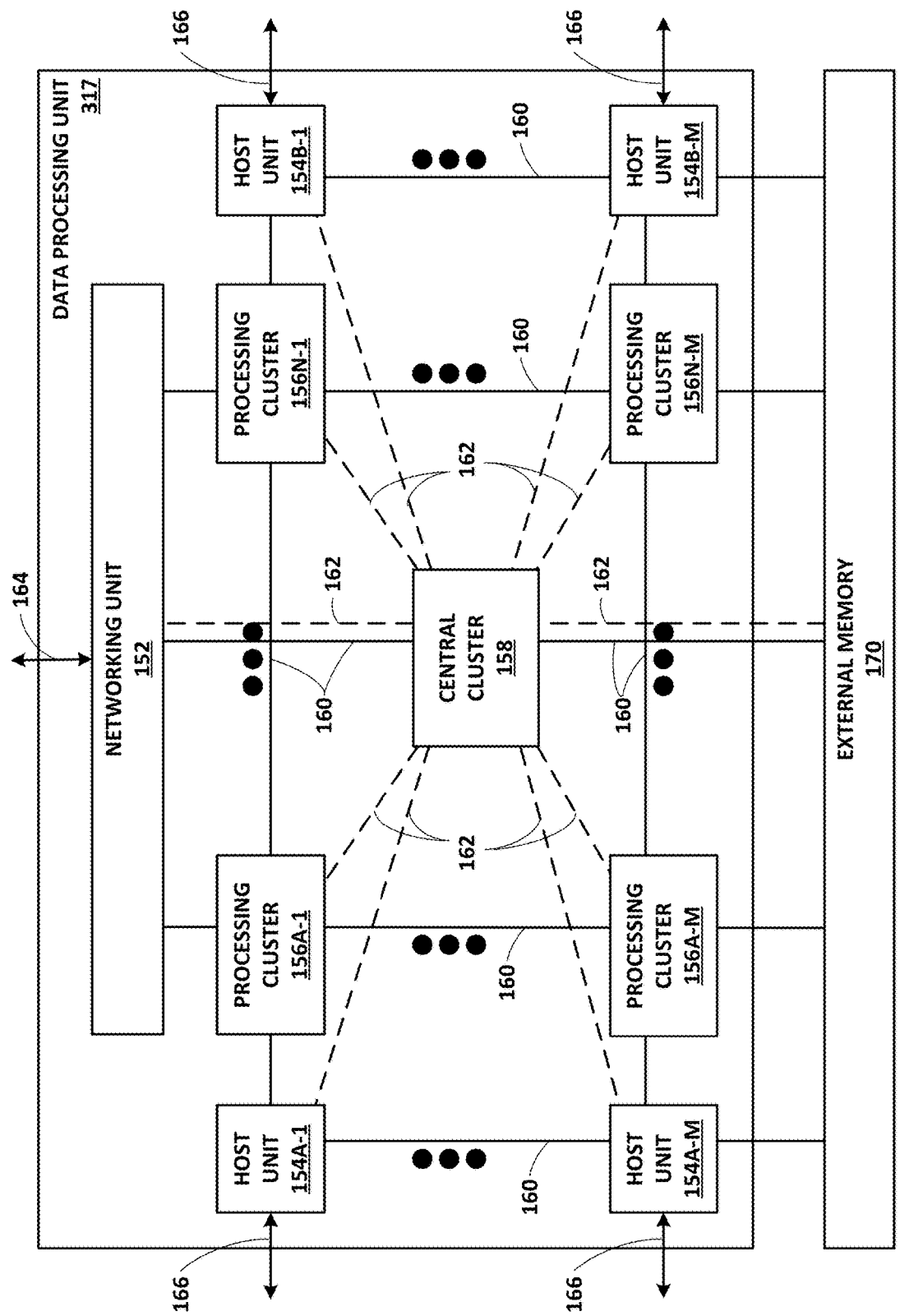
FIG. 3 is a block diagram illustrating another example of an example DPU, in accordance with one or more aspects of the present disclosure.

Example architectures of nodes 17 are described herein with respect to FIG. 2A and FIG. 3. For some or all of such examples, the architecture of each node 17 comprises a multiple core processor system that represents a high performance, hyper-converged network, storage, and data processor and input/output hub. The architecture of each node 17 may be optimized for high performance and high efficiency stream processing. For purposes of example, DPUs corresponding to or within each node 17 may execute an operating system, such as a general-purpose operating system (e.g., Linux or Unix) or a special-purpose operating system, that provides an execution environment for data plane software for data processing.

More details on how nodes 17 may operate are available in U.S. Pat. No. 10,841,245, entitled "Work Unit Stack Data Structures in Multiple Core Processor System," U.S. Pat. No. 10,540,288, entitled "EFFICIENT WORK UNIT PROCESSING IN A MULTICORE SYSTEM", filed Feb. 2, 2018, and in U.S. Pat. No. 10,659,254, entitled "Access Node Integrated Circuit for Data Centers which Includes a Networking Unit, a Plurality of Host Units, Processing Clusters, a Data Network Fabric, and a Control Network Fabric." All of these publications are hereby incorporated by reference.

Figure 1B:
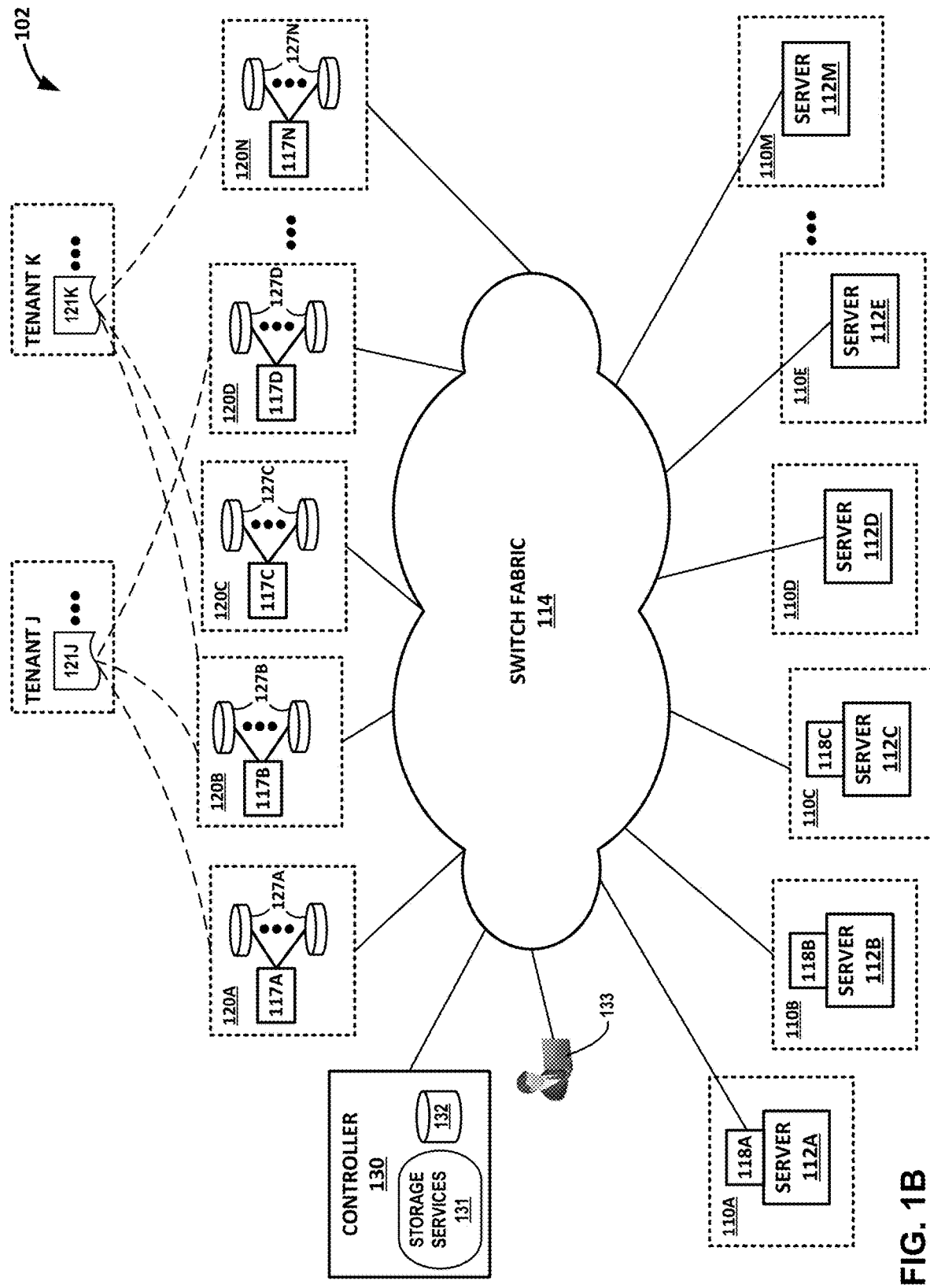
FIG. 1B is a simplified block diagram illustrating an example storage cluster, in accordance with one or more aspects of the present disclosure.

FIG. 1B is a simplified block diagram illustrating an example storage cluster, in accordance with one or more aspects of the present disclosure. FIG. 1B illustrates storage cluster 102, which may be considered to be an example storage cluster included within data center 101 of FIG. 1A. Storage cluster 102 in FIG. 1B is similar to the illustration of data center 101 of FIG. 1A, and includes many of the same components illustrated in FIG. 1A. However, elements of FIG. 1A have been rearranged within FIG. 1B to help illustrate certain aspects of how storage cluster 102 might be implemented within data center 101.

In the example of FIG. 1B, storage cluster 102 includes controller 130, one or more initiator nodes 110, and one or more storage nodes 120, all capable of communicating through switch fabric 114. One or more volumes 121 (e.g., volume 121J and volume 121K) each represent a "volume," which might be considered a conceptual abstraction of a unit of storage in storage cluster 102. Volumes may be associated with different tenants or customers of data center 101 of storage cluster 102. For example, in the example illustrated in FIG. 1B, volume 121J has been allocated for use by tenant J, while volume 121K has been allocated for use by tenant K. In FIG. 1B, dotted lines radiating from each of volumes 121J and 121K are intended to illustrate that such volumes 121 are each stored across multiple storage nodes 120. Although only two volumes are illustrated in FIG. 1B, storage cluster 102 may support many more volumes 121 for many more tenants.

As in FIG. 1A, controller 130 provides cluster management orchestration of storage resources within storage cluster 102. Also, as in FIG. 1A, controller 130 may be implemented through any suitable computing system, including one or more compute nodes within data center 101 or storage cluster 102. Although illustrated as a single system within storage cluster 102 in FIG. 1B, controller 130 may be implemented as multiple system and/or as a distributed system that resides both inside and outside data center 101 and/or storage cluster 102. In other examples, controller 130 some or all aspects of may be implemented outside of data center 101, such as in a cloud-based implementation.

In the example shown, controller 130 includes storage services module 131 and data store 132. Storage services module 131 of controller 130 may perform functions relating to establishing, allocating, and enabling read and write access to one or more volumes 121 within storage cluster 102. In general, storage services module 131 may perform functions that can be characterized as "cluster services," which may include allocating, deleting, creating, and/or deleting volumes. As described herein, storage services module 131 may also provide services that help ensure compliance with quality of service standards for volumes 121 within storage cluster 102. In some examples, storage services module 131 may also manage input from one or more administrators (e.g., operating administrator device 133). In general, storage services module 131 may have a full view of all resources within storage cluster 102 and how such resources are allocated across volumes 121.

Data store 132 may represent any suitable data structure or storage medium for storing information related to resources within storage cluster 102, and how such resources are allocated within storage cluster 102 and/or across volumes 121. Data store 132 may be primarily maintained by storage services module 131.

Each of initiator nodes 110 may correspond to or be implemented by one or more of the servers 12 and nodes 17 illustrated in FIG. 1A. Specifically, each of initiator nodes 110 is shown in FIG. 1B as including at least one server 112 and DPU 118. Each server 112 within initiator nodes 110 of FIG. 1B may correspond to one or more of servers 12 of FIG. 1A. Similarly, each DPU 118 within initiator nodes 110 of FIG. 1B may correspond to one or more of nodes 17 (or DPUs 17) of FIG. 1A. The descriptions of servers 12 and nodes 17 provided in connection with FIG. 1A may therefore apply to servers 112 and DPUs 118 of FIG. 1B.

Initiator nodes 110 illustrated in FIG. 1B may be involved in causing or initiating a read and/or write operation with the storage cluster represented by storage cluster 102. DPUs 118 within each of initiator nodes 110 may serve as the data-path hub for each of initiator nodes 110, connecting each of initiator nodes 110 (and storage nodes 120) through switch fabric 114. In some examples, one or more of initiator nodes 110 may be an x86 server that may execute NVMe (Non-Volatile Memory Express) over a communication protocol, such as TCP. In some examples, other protocols may be used, including, for example, "FCP" as described in United States Patent Publication No. 2019-0104206 A1, entitled "FABRIC CONTROL PROTOCOL FOR DATA CENTER NETWORKS WITH PACKET SPRAYING OVER MULTIPLE ALTERNATE DATA PATH," and which is hereby incorporated by reference.

Each of storage nodes 120 may be implemented by the nodes 17 and storage devices 127 that are illustrated in FIG. 1A. Accordingly, the description of such nodes 17 and storage devices 127 in FIG. 1A may therefore apply to DPUs 117 and storage devices 127 of FIG. 1B, respectively. Storage nodes 120 are illustrated in FIG. 1B to emphasize that in some examples, each of storage nodes 120 may serve as storage targets for initiator nodes 110 in FIG. 1B.

FIG. 1B also includes conceptual illustrations of volumes 121J and 121K. Within storage cluster 102, volumes 121 may serve as storage containers for data associated with tenants of storage cluster 102, where each such volume is an abstraction intended to represent a set of data that is stored across one or more storage nodes 120 of FIG. 1B. In some examples, each of volumes 121 may be divided into fixed size blocks and may support multiple operations. Typically, such operations generally include a read operation (i.e., reading one or more fixed-size blocks from a volume) and a write operation (i.e., writing one or more fixed-size blocks to a volume). Other operations are possible and are within the scope of this disclosure.

Often, numerous tenants share resources of storage cluster 102, including storage resources. To communicate or indicate the level of service a current or prospective tenant can expect from storage cluster 102, a service level agreement ("SLA") may be established between the operator of storage cluster 102 and a tenant or customer seeking to use services provided by storage cluster 102. Such SLAs may specify quality of service (QoS) standards that are used not only to ensure that each tenant gets the expected level of service (e.g., a "guaranteed service level"), but also to avoid a "noisy neighbor" problem arising from one tenant using so many resources of storage cluster 102 that such use disrupts or impacts the services provided to other tenants. Metrics that can be evaluated in order to assess or establish a QoS in a storage cluster might include processing operations and/or bandwidth measured in input/output operations per second ("IOPs") and latency measured in microseconds.

As described herein, a quality of service standard may include a guaranteed level of service. This may mean that resources needed for a storage service offered to a tenant should always be available from storage cluster 102 when needed. Storage cluster 102 may ensure that such guaranteed levels of service are met by managing and provisioning resources within storage cluster 102 (e.g., DPUs 117, storage devices 127, network resources, bandwidth, as well as others). Storage cluster 102 may also ensure that such guaranteed levels of service are met by appropriately allocating, placing, moving volumes within storage cluster 102, and in addition, rate limiting various operations involving the volumes.

In addition, a quality of service standard may enable tenants to use resources up to a maximum level of usage or service. Storage cluster 102 may enable tenants to use resources within storage cluster 102 up to this maximum level of usage or service ("maximum QoS") when there are unused resources available within storage cluster 102. Storage cluster 102 may employ a scheduling algorithm, such as the Excessive Weighted Round Robin algorithm (EWRR) algorithm, for admitting work into storage cluster 102. In some examples, storage cluster 102 may make decisions about scheduling at the entry point(s) of storage cluster 102 (e.g., initiator nodes 110) so it is possible to back pressure each of initiator nodes 110 as quickly as possible. Preferably, the scheduling algorithm used ensures that storage cluster 102 allows more work, up to maximum QoS limits, when resources allocated for other volumes are unused.

In general, storage cluster 102 may enforce certain constraints on the number of read operations and write operations of a given fixed block size performed per unit of time for each volume. These operations may be described or measured in terms of the "IOPs," as noted above. In some examples, constraints on read and write operations may be specified by parameters (each typically expressed in terms of "IOPs") that are specified when a volume is created. In some examples, independent constraints are provided for both read and write storage cluster operations in terms of IOPs.

For example, "RG" may be the rate of read operations per second that is guaranteed (R="Read" and G="Guaranteed") for a specified volume, assuming, of course, that there is demand that such operations be performed. Therefore, given that there might be no demand for read operations associated with a specific volume, the actual rate that is guaranteed is the minimum of RG and the actual dynamic read demand being experienced by that specific volume at a particular time. "RM" may be the rate of read operations that storage cluster 102 will not permit to be exceeded (M="Maximum"), independent of the demand. "WG" may be the rate of write operations per second that is guaranteed for the specified volume (W="Write"), again assuming, of course, that there is demand. As with the guaranteed read rate, the rate actually guaranteed is the minimum of WG and the dynamic write demand being experienced by that specific volume at a particular time. "WM" is the rate of write operations per second that storage cluster 102 will not permit to be exceeded, independent of the demand.

Separate and independent constraints for read and write operations, as outlined above, may be appropriate at least because the overall processing effort for a write operation may be considerably higher than for a corresponding read operation. For example, a read operation to a non-durable volume might only consume a small number of processor cycles in one DPU 117 (i.e., the DPU 117 the one containing the non-durable volume). However, a write operation to a compressed durable volume will consume more processor cycles writing data to more than one other DPU 117 (e.g., one DPU 117 associated with a primary node, one associated with a secondary node, and one or more associated with plex nodes that are used to store the data). Further, although it may be possible to specify a blended (or mixed) IOPs rate (rather than specifying separate read and write rates), specifying a blended rate is less complete than specifying independent read and write rates.

Note that the terms "guaranteed" and "maximum" may be more accurate descriptions of the above-described terms than "minimum" and "maximum." Use of the terms "minimum" and "maximum" together might imply that for the minimum rate, the rate does not drop below the specified minimum value. In some implementations, this is not quite accurate, since when there is no demand on a given volume, the rate of operations performed for that volume might be zero.

The quality of service standard may also be adaptive to accommodate dynamic demand for resources within storage cluster 102 at any given time exceeding the total amount of resources offered by storage cluster 102. For example, it may be appropriate for storage cluster 102 to be oversubscribed, since oversubscribing resources may lead to a more efficient allocation of resources over the long term. It is therefore possible that if all tenants of storage cluster 102 seek to simultaneously use their guaranteed allocation of resources within storage cluster 102, the aggregate demand for resources could exceed the total resources available within storage cluster 102. Storage cluster 102 (or, in some cases controller 130) may detect this excess demand by monitoring the total QoS delivered by storage cluster 102. If demand exceeds or is close to exceeding available resources, storage cluster 102 may, in some examples, move one or more volumes 121 within storage cluster 102 or to another location. In other examples, storage cluster 102 may adaptively degrade the QoS provided to each of the tenants sharing storage cluster 102. In most cases, it is advisable to apply such degradation to all tenants within storage cluster 102 in the same way so that each is affected to the same extent.

Applying quality of service standards to storage scenarios has been traditionally performed, if at all, to prioritize storage in storage area networks. However, applying quality of service standards across nodes, DPUs, resources, and/or operation types (e.g., reads, writes, encryption operations, data compression operations, erasure coding operations, other operations) within a storage cluster, particularly one that serving as a scale out and disaggregated storage cluster, as described herein, is particularly complex, but can be performed effectively using the techniques described herein. In particular, techniques described herein enable predictable and adaptive quality of service standards to be achieved effectively in a large scale out disaggregated storage cluster. In addition, techniques described herein may apply to a variety of storage solutions, including but not limited to, block storage, object storage, and file storage.

In FIG. 1B, and in accordance with one or more aspects of the present disclosure, storage cluster 102 (or data center 101 of FIG. 1A) may establish quality of service standards for customers, tenants, operations, and/or resources. For instance, with reference to FIG. 1B, storage cluster 102 may, for a specific tenant, establish a quality of service standard based on a service level agreement associated with or executed by the tenant. In some examples, a quality of service standard may specify, for each tenant, for each storage cluster resource, and/or for each type of operation associated with a given resource, a set of standards that outline performance, availability, capacity, or other expectations associated with services provided by storage cluster 102. As described herein, the set of standards may specify a guaranteed allocation of performance, availability, capacity, or other metric or attribute for a given resource within storage cluster 102. Further, the set of standards may specify a maximum allocation of performance, availability, capacity, or other metric or attribute for the given resource.

In some examples, controller 130 may receive information describing the quality of service standards, where the information is from or derived from input originating from an administrator (e.g., through administrator device 133). In other examples, such input may originate from a representative of the tenant (e.g., through a client device, not specifically shown in FIG. 1B), where the representative selects or specifies attributes of the desired service level agreement or quality of service standard. Quality of service standards may be established for other tenants in the same or a similar way, thereby enabling tenants to customize services provided by storage cluster 102 pursuant to their own needs. In other examples, storage cluster 102 may offer other the same quality of service to each tenant of storage cluster 102.

Controller 130 may receive a request to allocate a volume. For instance, in an example that can be described with reference to FIG. 1B, controller 130 detects input that it determines corresponds to request to create a new volume. In some examples, the input originates from one or more of initiator nodes 110, seeking to allocate new storage for a tenant of storage cluster 102 (e.g., tenant "J" or tenant "K" depicted in FIG. 1B). In other examples, the input may originate from an administrator device (e.g., administrator device 133), which may be operated by an administrator seeking to allocate new storage on behalf of a tenant of storage cluster 102. In still other examples, the input may originate from a different device.

Controller 130 may allocate a volume. For instance, again referring to FIG. 1B, controller 130 outputs information about the request to allocate a new volume to storage services module 131. Storage services module 131 evaluates the information and determines that the request is for a new volume is to be allocated for a specific tenant (i.e., tenant "J" in the example being described). Storage services module 131 further determines, based on the input received by controller 130, information about the volume type and the quality of service to be associated with the new volume. Storage services module 131 accesses data store 132 and determines which of storage nodes 120 may be allocated to supporting the new volume. In some examples, such a determination may involve evaluating which DPUs 117 and storage devices 127 within storage nodes 120 are available to be involved in serving read and write requests to the new volume. In the example being described, storage services module 131 determines that new volume 121J is to be allocated in response to the input, and further, that volume 121J is a durable volume allocated using multiple storage nodes 120. Specifically, storage services module 131 determines that volume 121J is to be allocated using resources from storage nodes 120A, 120B, and 120D as illustrated by dotted lines radiating from volume 121J in FIG. 1B. Storage services module 131 causes controller 130 to allocate volume 121J within storage cluster 102.

Controller 130 may allocate specific storage nodes 120 as primary, secondary, and plex nodes for volume 121J. For instance, in some examples, storage services module 131 may allocate volumes using a primary target node along with a number of "plex" nodes. In some implementations, the primary target node may be used as a communication or interaction point for other devices within storage cluster 102 (e.g., initiator nodes 110). The "plex" nodes may be used to store the data associated with a volume and may be managed by the primary target node. Generally, durable volumes tend to be stored across multiple storage nodes 120 and/or multiple fault domains and are often stored using an erasure coding or other data durability scheme. In the example being described, storage services module 131 may designate storage node 120A as a "primary" target node that serves as a primary target or interaction node for operations involving the volume, with one or more of storage nodes 120A, 120B, and 120D serving as "plex" nodes that are used to store data associated with the volume.

Storage services module 131 may also designate one of the three storage nodes 120, such as storage node 120B, as a "secondary" target node which serves as a failover target or interaction node when primary storage node 120A is not available or is inoperable. Typically, storage services module 131 ensures that the designated primary target node (i.e., storage node 120A) and the secondary target node (i.e., 120B) are assigned to different storage nodes 120. Similarly, each of the plex nodes are often stored across different storage nodes 120 or fault domains, but in some cases, the same storage node 120 may be used for both a plex node and the primary target (or, alternatively, as a plex node and the secondary target node). In the example being described, volume 121J is allocated using three storage nodes 120, but in other examples, volume 121J could be stored using a different number of storage nodes 120.

Controller 130 may update resource information based on the allocation of volume 121J. For instance, continuing with the example being described with reference to FIG. 1B, storage services module 131 maintains a counter of available resources within storage cluster 102, and when allocating volume 121J, storage services module 131 decrements the counter associated with the resources used for volume 121J. Storage services module 131 may decrement the counter by an amount corresponding to the functionality need for the type of volume being allocated. In some examples, different numbers of or types of resources may be used for different types of volumes. If a volume is a durable volume, for example, more than one storage node 120 is often used to ensure data redundancy. If a volume is a compressed and/or encrypted volume, other resources such as compression or cryptographic hardware or accelerators within one or more of DPUs 117 may be required. Storage services module 131 may update the appropriate counters in an appropriate way based on the size, type, or other attributes of newly allocated volume 121J. Storage services module 131 may store the counters or information about the counters within data store 132. Storage services module 131 may also store, within data store 132, information about quality of service standards and/or service level agreements associated with volume 121J. In some examples, such information may involve guaranteed service levels for storage space and processor cycles as well as maximum service levels for storage space and processor cycles.

Controller 130 may allocate subsequent volumes based on availability. For instance, continuing with the example being described in connection with FIG. 1B, controller 130 detects input that controller 130 determines corresponds to another request to create a new volume. Controller 130 outputs information about the input to storage services module 131. Storage services module 131 evaluates the input and determines, based on the input, that the new volume is to be allocated for a different tenant (i.e., "tenant K"). Storage services module 131 further evaluates the input and attempts to find a best fit for the new volume (e.g., volume 121K) based on criteria that includes the number of processing cycles available within each of storage nodes 120 and the storage space available within each of storage nodes 120. In some examples, storage services module 131 may also seek to allocate resources to the volume 121K to ensure that the resources associated with the new volume are allocated across multiple fault zones, thereby helping to ensure that any failures associated with resources allocated to the volume have a limited impact on the volume. Similarly, storage services module 131 may also consider other issues, including wear level profiles associated with storage devices 127 within the storage nodes 120 allocated to the new volume, in an attempt to increase the reliability, performance, and/or efficiency of the newly allocated volume. Based on such considerations, storage services module 131 allocates volume 121K using storage nodes 120B, 120C, and storage node 120N in the example illustrated in FIG. 1B. Each time controller 130 allocates new volumes, it may update appropriate counters in a manner that corresponds to the functionality needed for the newly allocated volume (durable, compressed, encrypted, or other attributes). When a volume is deallocated or deleted, controller 130 may return the resources (e.g., storage capacity, processor cycles, SSD cycles, and other resources) associated with each DPU 117 to the pool of resources available to be allocated to new volumes.

In the example described, volume 121J and volume 121K are associated with different tenants within storage cluster 102. Yet storage services module 131 of controller 130 may allocate volume 121K and volume 121J such that volume 121K and volume 121K share resources associated with one or more of storage nodes 120. Specifically, in the example being described, both volume 121J and volume 121K share resources of storage node 120B (i.e., DPU 118B and/or storage devices 127B), since both volume 121K and volume 121J are supported by storage node 120B. Accordingly, resources of each of storage nodes 120 may be allocated to multiple volumes 121 across multiple tenants.

Once allocated, storage cluster 102 may schedule an operation to be performed on a volume. For instance, continuing with the example being described in connection with FIG. 1B, DPU 118A of initiator node 110A detects input from server 112A. DPU 118A determines that the input corresponds to a request to perform an operation on volume 121J. In some examples, DPU 118A may receive the input from server 112A of initiator node 110A in response to server 112A performing processing on behalf of tenant J and seeking to store data (or perform another operation) within storage cluster 102. In other examples, DPU 118A may receive the input from server 112A in response to server 112A receiving input from an authorized user of tenant J. In either case, DPU 118A may output a signal over switch fabric 114. Storage node 120A, acting as the primary target node for volume 121J, detects a signal and outputs information about the signal to DPU 117A. In some examples, if DPU 117A and/or storage node 120A are idle, DPU 117A may cause the operation to be performed. However, in other examples, such as if DPU 117A and/or storage node 120A are not idle, DPU 117A queues the operation (e.g., in a queue maintained by DPU 117A) to be performed at a later time.

Storage cluster 102 may cause the queued operation to be performed on the volume when resources are available. For instance, continuing with the example being described in connection with FIG. 1B, DPU 117A maintains a count (e.g., a credit count) that is used to determine when to dequeue operations from the queue and cause them to be executed. In some examples, the credit count is increased periodically over time, and when sufficient credits are available to perform an operation, an operation is dequeued from a queue and executed. The credit count may be decreased as operations are dequeued from the queue and executed.

As described herein, other storage nodes 120 may serve as a secondary and/or plex node associated with volume 121J. For instance, when an operation involving volume 121J is performed, other storage nodes 120 associated with volume 121J may also have to perform operations. As an example, if storage node 120B serves as the secondary target node and/or a plex node for volume 121J, storage node 120B may have work to do to complete the requested operation. In such an example, DPU 117B of storage node 120B may queue operations to be performed at a later time, in a manner similar to that described in connection with DPU 117A and storage node 120A. DPU 117B may periodically increase its own credit count over time, thereby making credits available, and thereby enabling operations to be dequeued and executed. As work is dequeued and executed, DPU 117B may correspondingly decrease a credit count associated with the resources of DPU 117B (or storage node 120B) being used to perform the operation. In this way, operations associated with volume 121J are eventually performed, in a rate-limited way, by each of storage nodes 120 that are used to implement volume 121J.

For storage cluster 102, two primary operations to be performed are write operations and read operations. Both write and read operations are generally associated with a given volume 121. In addition, both write and read operations for a given volume 121 may involve use of storage resources across multiple storage nodes 120.

For example, storage cluster 102 may service a write request associated with an allocated volume. For instance, in another example that can be described in connection with FIG. 1B, DPU 118A of initiator node 110A detects input from server 112A. DPU 118A determines that the input corresponds to a request to initiate a write operation to volume 121J. DPU 118A outputs a signal over switch fabric 114. Storage node 120A, acting as the primary target node for volume 121J, detects a signal and outputs information about the signal to DPU 117A. DPU 117A determines that the signal corresponds to a request to write data to volume 121J. DPU 117A further determines that the signal includes data to be written to volume 121J. DPU 117A interacts with the plex nodes associated with volume 121J (e.g., one or more of storage nodes 120A, 120B, or 120D) and writes data to one or more storage devices 127 within storage nodes 120A, 120B, and/or storage node 120D. DPU 117A may write data to such storage nodes 120 using the data durability attributes, compression attributes, encryption attributes, or other attributes associated with volume 121J. Each of storage nodes 120 involved in such a write operation may queue work associated with the write operation to be performed pursuant to the quality of service standards (or service level agreements) associated with volume 121J. If too much work is queued and/or insufficient processing credits are available within one or more of the storage nodes 120 associated with volume 121J, each such storage node 120 may refrain from processing the work until the queues have less work and/or until sufficient credits are available to enable processing of the work. DPU 117A also logs information about the write operation to storage node 120B which serves as a secondary target node for volume 121J. By writing such information to storage node 120B, storage node 120B may be capable of serving as a failover target node should storage node 120A because unavailable or inoperable. Logging information about the write operation to storage node 120B may also be performed pursuant to the quality of service standards (or service level agreements) associated with volume 121J.

Storage cluster 102 may service a read request associated with an allocated volume. For instance, continuing with the example being described with reference to FIG. 1B, DPU 118B of initiator node 110A may detect input from server 112B. DPU 118B determines that the input corresponds to a request to read data from volume 121J. DPU 118B outputs a signal over switch fabric 114. Storage node 120A, acting as the primary target node for volume 121J, detects a signal and outputs information about the signal to DPU 117A. DPU 117A determines that the signal corresponds to a request to read data from volume 121J. DPU 117A interacts with one or more of the plex nodes associated with volume 121J and accesses the requested data from volume 121J. When DPU 117A interacts with each of storage nodes 120 involved in the read operation, each involved storage node 120 may queue work associated with the read operation pursuant to the quality of service standards associated with volume 121J and ensure the read operation is performed in a manner consistent with such standards. After accessing one or more storage nodes 120 associated with volume 121J, DPU 117A outputs a signal over switch fabric 114. DPU 118B of initiator node 110B detects a signal over switch fabric 114 and determines that the signal includes the information requested in the original request to read data.

Storage cluster 102 may detect a risk that the quality of service guarantees associated with one or more volumes 121 might not be satisfied. For instance, in some examples, one or more of storage nodes 120 may detect that one or more of volumes 121 allocated and utilized within storage cluster 102 are being utilized to an extent that nears the maximum storage, processing, and/or other capability of storage cluster 102. Such a situation can arise if controller 130 and/or storage nodes 120 enable oversubscription, which may involve guaranteeing a quality of service standard that storage cluster 102 cannot be simultaneously provide to each of the allocated volumes 121 within storage cluster 102. Oversubscription may be enabled, however, because in many cases, it is rare that all volumes 121 would require the guaranteed QoS at the same time, and oversubscription enables storage cluster 102 to be used more efficiently over the long run. In some examples, therefore, controller 130 and/or storage nodes 120 may allow oversubscription of the quality of service standards and/or service level agreements associated with volumes 121. If oversubscription is enabled, resource conflicts may arise when the number of active volumes 121 collectively require more performance than can be provided by storage cluster 102. One or more of storage nodes 120 (or controller 130) may detect a risk of conflicts when the throughput or utilization of one or more resources associated with volumes 121 (e.g., storage space, processing cycles, bandwidth, input/output cycles associated with SSDs or other storage devices) exceeds a threshold. In some cases, the threshold may be just below 100%, such as at 95%.

Storage cluster 102 may move one or more volumes to address the risk that quality of service guarantees might not be satisfied. For instance, in an example that can be described in the context of FIG. 1B, controller 130 monitors operation of storage cluster 102. Controller 130 identifies one or more volumes 121 that, if moved, may alleviate the overly-high utilization experienced by the collection of volumes 121 within storage cluster 102. In one example, controller 130 may identify volume 121K as a candidate volume that should be moved to address the oversubscription. In other examples, controller 130 may identify additional volumes 121 to move. Controller 130 identifies a destination location for volume 121K. Such a destination may be within storage cluster 102, but may involve a different set of storage nodes 120. In other examples, such a destination may be outside storage cluster 102. When controller 130 moves volume 121K to the identified destination, controller 130 may initiate a failover of the volumes so that there is little or no disruption to service within storage cluster 102. Controller 130 readjusts, based on the move, information about the resources allocated to the affected volumes 121. Controller 130 updates information about the allocated resources in data store 132.

Storage cluster 102 may perform an adaptive degradation process in response to determining that quality of service guarantees might not be satisfied. For instance, in an example where controller 130 determines that there is no suitable destination for moving volume 121K, controller 130 may degrade the quality of service of all volumes 121 adaptively. Often, controller 130 will not know the total demand in such a situation, so controller 130 starts degrading the quality of service standards with a small degradation. If controller 130 detects continued high utilization, controller 130 may continue degrading the quality of service for all of the volumes in small increments until the total throughput across all volumes 121 within storage cluster 102 is below the full capacity of storage cluster 102 minus a hysteresis value. Although such degradation is described as being performed by controller 130, such a process may be performed by other systems within storage cluster 102, including storage nodes 120.

The techniques described herein may provide certain technical advantages. For instance, in examples where a storage cluster is implemented in a data center that is characterized by a scale-out and hyper disaggregated architecture, applying a hierarchical and granular approach to providing quality of service, as described herein, can result in effective use of available resources. In some cases, such effective use of resources may involve associating an allocation of a storage resource with a given tenant, where that allocation is specified in terms of a guaranteed allocation and a maximum allocation of the storage resource. By using resources effectively, tenants, customers, and/or users of the storage cluster experience high throughput, less capacity constraints, and more reliable compliance with quality of service standards and/or service level agreements.

Further, by offloading data processing from general purpose CPUs in a data center to specialized processors (e.g., DPUs 117), the limits of scaling up the frequency and number of cores in such general purpose CPUs can be avoided or alleviated. Use of DPUs 117 to execute data-centric computations inside initiator nodes 110, storage nodes 120, and other systems may result in efficient and/or optimal use of available network resources, and may result in high throughput, less constraints, and more reliable network operation.

Modules illustrated in FIG. 1B (e.g., storage services module 131) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 2A is a block diagram illustrating an example node or data processing unit (DPU) 217, in accordance with the techniques of this disclosure. DPU 217 of FIG. 2 may generally represent any of nodes 17 of FIG. 1A or DPUs 117 of FIG. 1B. In some examples, DPU 217 represents a hardware chip implemented in digital logic circuitry and may be used in any computing or network device.

If deployed in the context of FIG. 1A and FIG. 1B, DPU 217 may be communicatively coupled to one or more network devices, server devices (e.g., servers 12 or servers 112), random access memory, storage media (e.g., solid state drives or SSDs), storage devices 127, a data center fabric (e.g., switch fabric 114), or the like, e.g., via PCI-e, Ethernet (wired or wireless), or other such communication media. Moreover, DPU 217 may be implemented as one or more application-specific integrated circuit (ASIC), may be configurable to operate as a component of a network appliance or may be integrated with other DPUs within a device.

In the illustrated example of FIG. 2A, DPU 217 includes one or more multi-core processors 135 having a plurality of programmable processing cores 140A-140N ("cores 140") coupled to an on-chip memory unit 134 and one or more storage devices 127A through 127N ("storage devices 127" and representing any number of storage devices). Each of cores 140 may a level 1 cache 141 (level 1 caches 141A, 141B, and 141N are associated with cores 140A, 140B, and 140N, respectively).

Memory unit 134 may include two types of memory or memory devices, namely coherent cache memory 136, non-coherent buffer memory 138, and non-volatile memory 139 (e.g., NVDIMM memory). Processor 135 also includes a networking unit 142, work unit (WU) queues 143, a memory controller 144, and accelerators 146. Although not shown, processor 135 may also include a storage device controller used when accessing storage devices 127. As illustrated in FIG. 2A, each of cores 140, networking unit 142, WU queues 143, memory controller 144, memory unit 134, and accelerators 146 are communicatively coupled to each other. In some examples, processor 135 of DPU 217 further includes one or more accelerators configured to perform acceleration for various data-processing functions, such as look-ups, matrix multiplication, cryptography, compression, regular expressions, or the like.

In the example of FIG. 2A, DPU 217 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 114 of FIG. 1A or FIG. 1B. DPU 217 may also include one or more interfaces for connectivity to host devices (e.g., servers) and data storage devices, e.g., solid state drives (SSDs) via PCIe lanes. DPU 217 may further include one or more high bandwidth interfaces for connectivity to off-chip external memory.

Processor 135 further includes accelerators 146 configured to perform acceleration for various data-processing functions, such as look-ups, matrix multiplication, cryptography, compression, data durability and/or reliability, regular expressions, or the like. For example, accelerators 146 may comprise hardware implementations of look-up engines, matrix multipliers, cryptographic engines, compression engines, or the like. In accordance with the some implementations described herein, accelerators 146 may include a data durability unit that may be used to implement one or more data durability and/or reliability schemes. In some examples, such a data durability unit may be configured to perform matrix multiplication operations commonly performed in erasure coding schemes, such as Reed Solomon erasure coding schemes. Such a data durability unit may be configured to efficiently perform operations, such as those relating to Galois Field mathematics, that might be difficult and/or inefficient to perform using commonly available processors or other processing hardware. Further, such a data durability unit may be designed to perform and/or implement multiple different types of data durability schemes by configuring different matrices specific to each implementation.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on a bifurcated memory system that may be included in DPU 217 are available in U.S. Pat. No. 10,565,112, filed Apr. 10, 2018, and titled "Relay Consistent Memory Management in a Multiple Processor System," the entire content of which is incorporated herein by reference.

Cores 140 may comprise one or more microprocessors without interlocked pipeline stages (MIPS) cores, advanced reduced instruction set computing (RISC) machine (ARM) cores, performance optimization with enhanced RISC-performance computing (PowerPC) cores, RISC Five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

In FIG. 2A, and in accordance with one or more aspects of the present disclosure, data processing unit 217 may process an operation in a storage cluster. For instance, networking unit 142 of data processing unit 217 receives an indication of work associated with a read or write operation associated with a data storage unit (e.g., a "volume") in a storage cluster, such as storage cluster 102 of FIG. 1B. Networking unit 142 outputs information about the work to one or more of cores 140. One or more of such cores 140 queues the work to be processed by data processing unit 217 and/or by another data processing unit 217 within the storage cluster. In some examples, data processing unit 217 ensures the works is performed pursuant to quality of service standards associated with the relevant volume specified by the work. Data processing unit 217 may queue the work for later processing using a mechanism that ensures that quality of service standards (e.g., the guaranteed IOPs associated with the relevant volume) are met. If one or more queues associated with the relevant volume do not hold any other work, operations associated with the work may be performed without queueing the work for later processing. In such an example, data processing unit 217 may ensure that the work is not performed at a rate that exceeds the maximum quality of service level allowed by the QoS standards associated with the volume.

Figure 2B:
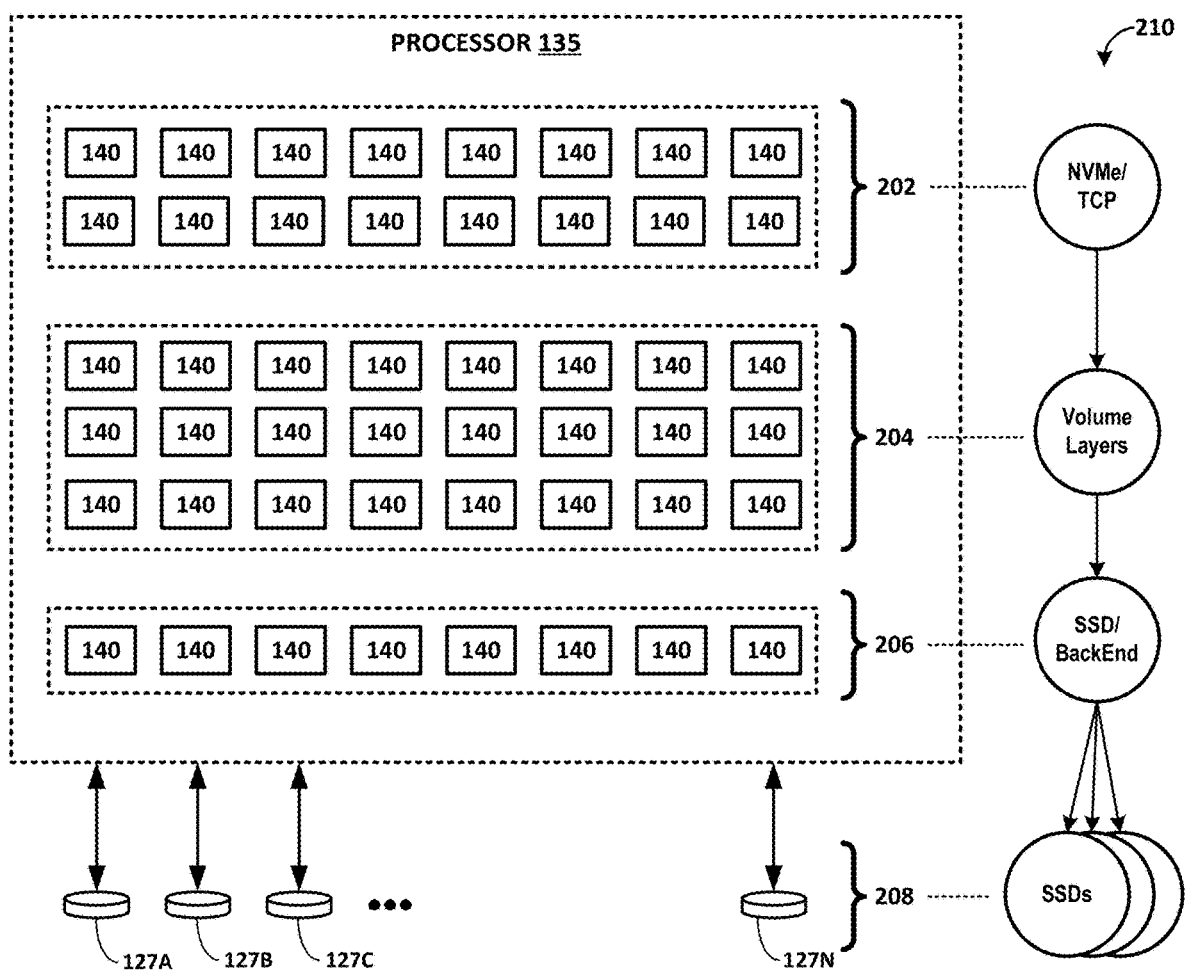
FIG. 2B is a conceptual diagram illustrating one possible partitioning of virtual processors within an example processor, in accordance with one or more aspects of the present disclosure.

FIG. 2B is a conceptual diagram illustrating one possible partitioning of virtual processors within an example processor, in accordance with one or more aspects of the present disclosure. FIG. 2B illustrates processor 135, which may correspond to processor 135 included within data processing unit 217 of FIG. 2A. As illustrated in FIG. 2B, processor 135 includes an array of processors corresponding to those included within data processing unit 217 of FIG. 2A. The processors illustrated in FIG. 2B are shown as an array of cores 140. Although the processors are illustrated as cores 140, such processors may alternatively be physical processors, virtual processors, hardware threads included within one or processing cores, or other processing units.

To support the significant bandwidth preferred for both frontend and backend operations (e.g., 400 Gbps bandwidth or more), the available processing cycles associated with the cores may be partitioned into 3 pools: networking pool 202, storage or volume pool 204, and SSD or backend pool 206. In the example of FIG. 2B, 48 cores 140 are illustrated, and each is allocated to one of these three functions. Each of the allocated functions may also correspond to a level in a hierarchy of resources, where networking pool 202 corresponds to NVMe/TCP operations, volume pool 204 corresponds to operations performed by the volume layers, and backend pool 206 corresponds to operations performed by the storage devices (e.g., SSDs) and/or the backend layer. SSD pool 208 is also included within core hierarchy 210 and represents the SSD resources included within a storage cluster.

Processing performed by the volume cores 140 (e.g., volume pools 204) tends to be the source of any bottleneck, so it may be appropriate to help ensure that the computational resources allocated to the cores used to service volume-related operations are sufficient, such as by allocating more resources to volume pool 204. Therefore, in the specific example illustrated in FIG. 2B, 16 cores are allocated to networking pool 202, 24 cores are allocated to volume pools 204, and 8 cores are allocated to backend pools 206. In addition, the scheduling logic (e.g., logic for scheduling operations across storage nodes 120 of FIG. 1B) may be implemented on some of cores 140 from networking pools 202. Partitioning computational resources as illustrated in FIG. 2B may enable quality of service standards to be supported for many volumes (e.g., on the order of thousands or more) on a per-volume basis.

Accordingly, within each data processing unit 217, the CPU cores may be hard partitioned to perform separate processing operations (i.e., network, volume, and back-end). This partitioning may be done in a way that ensures that cores 140 serving the network and backend functions will not likely become a bottleneck for any of the scenarios considered, even if less computational resources are allocated to networking pool 202 and backend pool 206.

There may be a wide variation in performance expectations for a given volume (e.g., on the order of 1K to 2M IOPs). As described below in connection with FIG. 5A and FIG. 5B, managing quality of service standards may be performed using a hierarchical tree of resources with a set of queues acting as leaf nodes in the tree. To support high performance volumes from the perspective of one or more of initiator nodes 110 (see FIG. 1B), multiple queues per volume may need to be supported. In some examples, this may mean translate into one TCP connection per queue. In some cases, however, multiple queues can be merged into a single queue (e.g., when using FCP protocol, described in United States Patent Publication No. 2019-0104206 A1, entitled "FABRIC CONTROL PROTOCOL FOR DATA CENTER NETWORKS WITH PACKET SPRAYING OVER MULTIPLE ALTERNATE DATA PATH," and which is hereby incorporated by reference).

In some examples, code or logic that manages and/or ensure compliance with QoS standards may execute on some of the cores 140 assigned to volume pool 204. For instance, if 32K queues (see, e.g., FIG. 5A and FIG. 5B) are supported, and 32 processors/cores/virtual processors are allocated to networking pool 202, each processor/core/virtual processor may be responsible for 1000 queues. However, as QoS are managed on a per-volume basis, all the queues belonging to a volume may be managed together, which may require that all of those queues should be handled by a single processing unit to be performance and/or cache efficient. When a single volume requires a very high number of IOPs, the queues belonging to that volume may be split into a few groups as a single networking processing unit (e.g., core 140) might not have enough processing capability. In such an example, the required QoS may be split among the groups with each group managed by its own QoS rate limiter/shaper. In some examples, the QoS rate limiter/shaper may execute the EWRR algorithm, referenced above. When the QoS of a volume is split among multiple shapers, all these shapers together will typically provide the required QoS by sharing the available credits. All the shapers belonging to a volume (or a shared volume which is a volume shared with multiple initiators) will typically consult a common process periodically for sharing the credits.

Volume aggregates may be needed to support QoS for snapshots and clones and also for high performance volumes that may be implemented using striping. It may be possible to handle volume aggregates within a three level QoS hierarchy (see FIG. 5A and FIG. 5B) by having the storage service operations (e.g., those handled by controller 130) statically distribute the guaranteed and maximum (G, M) values for the aggregate over the volumes that are part of the aggregate. Therefore, even though there may be four levels of abstraction (queues, volumes, volume aggregates, and root), it may be possible to handle volume aggregates with only three levels in the QoS hierarchy.

FIG. 3 is a block diagram illustrating another example of an example DPU, in accordance with one or more aspects of the present disclosure. DPU 317 of FIG. 3 may operate substantially similar to and generally represent any of nodes 17 of FIG. 1A or DPUs 117 of FIG. 1B. Therefore, like data processing unit 217 of FIG. 2A, if DPU 317 is deployed in the context of FIG. 1A and FIG. 1B, data processing unit 317 may be communicatively coupled to a data center fabric (e.g., switch fabric 114), one or more server devices (e.g., servers 12 or servers 112), storage media (e.g., SSDs), storage devices 127, one or more network devices, random access memory, or the like, e.g., via PCI-e, Ethernet (wired or wireless), or other such communication media in order to interconnect each of these various elements. In some examples, DPU 317 may represent a hardware chip implemented in digital logic circuitry. DPU 317 may also be implemented as an integrated circuit mounted on a motherboard of a computing, networking and/or storage device or installed on a card connected to the motherboard of the device.

As with other implementations of example DPUs described and/or illustrated herein, DPU 317 may represent a high performance, hyper-converged network, storage, and data processor and input/output hub. As illustrated in FIG. 3, DPU 317 includes networking unit 152, processing clusters 156A-1 to 156N-M (processing clusters 156), host units 154A-1 to 154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM), dynamic random access memory (DRAM), or non-volatile memory.

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 317, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows DPU 317 to operate as an endpoint or as a root. For example, DPU 317 may connect to a host system (e.g., a server) as an endpoint device, and DPU 317 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

DPU 317 may provide optimizations for stream processing. For instance, DPU 317 may execute an operating system that facilitates run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In one example, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

Figure 4:
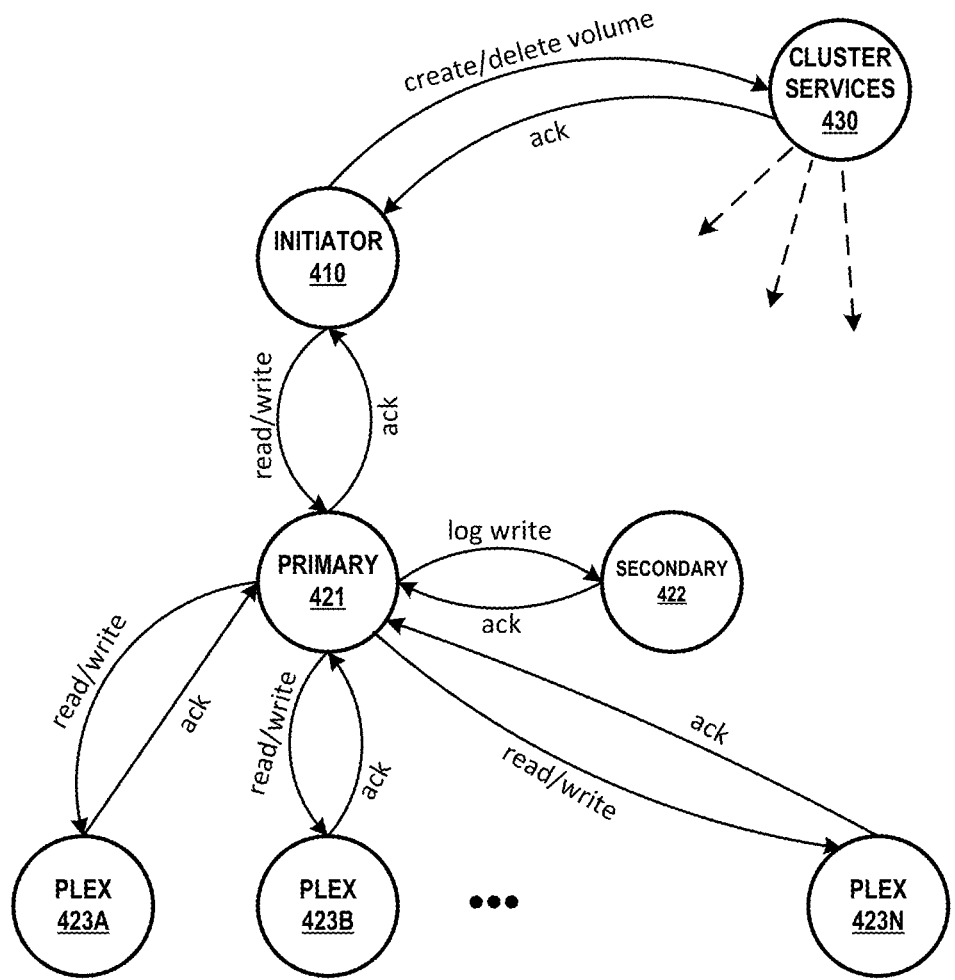
FIG. 4 is a conceptual diagram illustrating various roles played by one or more nodes in a storage cluster, in accordance with one or more aspects of the present disclosure.

FIG. 4 is a conceptual diagram illustrating various roles played by one or more nodes in a storage cluster, in accordance with one or more aspects of the present disclosure. FIG. 4 can be described in the context of FIG. 1B. For example, in FIG. 1B, storage services module 131 of controller 130 performs various storage cluster services. Controller 130 of FIG. 1B may correspond to cluster services node 430 of FIG. 4. Also, in the context of FIG. 1B, initiator node 410 corresponds to one of initiator nodes 110, while primary node 421, secondary node 422, and plex nodes 423 correspond to one or more of storage nodes 120. As illustrated in FIG. 1B, the overall functionality of storage cluster 102 may be divided into control operations that are performed by cluster services node 430 (i.e., controller 130 of FIG. 1B), and data operations that are executed by initiator node 410 (i.e., initiator nodes 110 of FIG. 1B) and primary node 421, secondary node 422, and plex nodes 423 (i.e., storage nodes 120 of FIG. 1B). The cluster service node 430 communicates with all DPU based nodes. In this case, it may also communicate with some or all of the primary, plex, and secondary nodes.

The control operations performed by cluster services node 430 in FIG. 4 are primarily operations to create and delete volumes (i.e., the basic unit of storage abstraction). Cluster services node 430 may, however, also perform other operations. In general, control operations may be performed by cluster services node 430 communicating with other DPU-based nodes (e.g., primary, secondary, and plex nodes, along with DPU-based initiator nodes). The control operations may be initiated by users via a higher level orchestration system using an intent based API provided by the cluster services node 430. In response, the cluster services node 430 configures the storage nodes of the cluster as appropriate. As discussed below, read/write operations are often data operations initiated by the initiator nodes 110. The "ack" communications illustrated in FIG. 4 (flowing from cluster services node 430 to initiator 410) may be considered acknowledgements of those read/write operations. The functions performed by cluster services node 430 when creating a volume may include "allocation," which is the process of assigning resources (e.g., DPUs 117, storage devices 127, bandwidth, and/or other network resources) on behalf of a volume at the time a volume is created by initiator node 410. Cluster services node 430 performs allocation operations when creating a volume, and cluster services node 430 may also later make adjustments to the initial allocation of resources associated with a volume. Such adjustments may be prompted by, for example, a need to move a volume to a different location (e.g., to a different set of storage nodes 120 within storage cluster 102). Such adjustments may also be prompted by a volume being deleted, with the adjustments in such a case resulting in resources being released back to the storage cluster. Allocation typically involves multiple resource types distributed across the network and may also involves taking other constraints into account (e.g., fault zones and wear profiles associated with physical storage devices). In some examples, the problem to be solved by allocation corresponds to or is equivalent to a problem sometimes referred to as multidimensional bin packing with constraints. Therefore, techniques and algorithms available for solving problems characterized as multidimensional bin packing with constraints may also be applied to allocation.

Data operations performed by initiator node 410, primary node 421, secondary node 422, and plex nodes 423 include read and write operations. Read and write operations may also be initiated by initiator node 410. In general, initiator node 410 initiates a read or write operation by interacting with primary node 421. Should primary node 421 be offline or otherwise unavailable, initiator node 410 interacts with secondary node 422. A read operation performed in the context of FIG. 4 may involve primary node 421 accessing data stored within at least some of plex nodes 423. For example, a durable volume may have data stored across multiple plex nodes 423 for redundancy purposes, so primary node 421 may access multiple plex nodes 423 in order to read the requested data. Similarly, a write operation may involve primary node 421 writing data to one or more of plex nodes 423. For a durable volume that implements a redundancy scheme (e.g., an erasure coding scheme), primary node 421 may write data to multiple plex nodes 423 within a storage cluster.

For write operations for a given volume, primary node 421 may also log information about the write operation to secondary node 422. If secondary node 422 is called upon to perform operations associated with the volume, secondary node 422 may therefore have the information needed to perform any associated with the volume.

Resources within a storage cluster are not often allocated exclusively to a volume, so they typically are shared dynamically across volumes. Sharing such resources may be performed through a process called scheduling. In some examples, scheduling may involve sharing resources dynamically (i.e. at the time of executing a read or write operation) with the goal of satisfying potentially competing constraints requested by active volumes within a storage cluster. Unlike allocation functions that are performed by initiator node 410, scheduling may, in some examples, be performed entirely by primary node 421, secondary node 422, and/or plex nodes 423. In other words, in the context of FIG. 1B, scheduling may be performed entirely by storage nodes 120 (or DPUs 117 within storage nodes 120), where DPUs 117 collaborate to schedule the use of network resources at run time. In some examples, the process of allocation might be considered to be static relative to read and write operations, while the scheduling process might be considered to be dynamic.

In FIG. 4, note that various DPUs 117 (and DPUs 118) included within corresponding initiator nodes 110 and storage nodes 120 (see FIG. 1B) may play different roles (e.g., initiator node 410, primary node 421, secondary node 422, plex node 423). In some examples, in order to maintain an appropriate quality of service level, it may be important to segregate the traffic received by primary nodes 421 from initiator nodes 410 (new work) from the traffic generated among DPUs 117 (e.g., corresponding to write operations from primary nodes 421 to secondary nodes 422 and primary nodes 421 to plex nodes 423). By segregating such traffic, it is possible to ensure that work admitted as guaranteed by QoS standards does not get backed up anywhere in the cluster by other work not subject to such QoS standards.

The rate at which read and write operations are executed can depend on many types of factors and resources. In practice, however, there is often one resource that turns out to be a bottleneck, and the availability of this resource tends to determine the service rate. In a data flow graph such as that illustrated in FIG. 4, it is unlikely that bottlenecks will develop simultaneously in multiple places during the processing of a given operation. Further, it is likely that different instances of the same operation will encounter the same bottleneck as will instances of other operations.

For example, each of DPUs 117 of FIG. 1B may have many internal resources. Such resources may include customized embedded processors with multiple threads or virtual processors (VPs), hardware accelerators (e.g., capable of performing encryption, compression, and other cryptographic operations) coherent and non-coherent memory operations involving on-chip and DDR memories, DMA engines, SSD processing capability and bandwidth. Yet it may be appropriate to make the simplifying assumption that processor cycles (i.e., VP cycles) tend to limit resource availability within DPUs 117, at least in so-far as storage operations are concerned. Also note that the processor or VP cycles needed for a given read or write operation are independent of the logical block size.

In FIG. 4, when allocating a volume, cluster services node 430 needs to know the amount of resources (e.g., processor cycles) expended per read and write for each of three DPUs 117 for each type of volume. There may be a significant number of volume types (e.g., durable, nondurable, encrypted, nonencrypted, compressed, not compressed, and volume types with any combination of these attributes). Therefore, there may be six static values for each volume type, which can be expressed as a 3×2 work matrix $WM_T$, where T is the volume type:

|  |  | Read | Write |
|---|---|---|---|
|  | Primary (P) | [ PR | PW ] |
| $WM_T =$ | Secondary (S) | [ SR | SW ] |
|  | Plex (X) | [ XR | XW ] |
| units: kilo-instructions |  |  |  |

In the matrix above, when no VP cycles are expended for an operation (e.g., the S and X column values for a non durable read), the corresponding values may be zero. When a volume is created, cluster services node 430 (e.g., based on input provided by a user of cluster services node 430) must supply the volume type T and the guaranteed and maximum rates for each of read and write (e.g., in a form such as the matrix above). In some examples, these rates may be termed GRIOPS (Guaranteed Read IOPs), MRIOPS (Maximum Read IOPs), GWIOPS (Guaranteed Write IOPs), and MWIOPS (Maximum Write IOPs). Cluster services node 430 may first translate the read and write guarantees (GRIOPS and GWIOPS) into instruction budgets in each of primary node 421, secondary node 422, and plex nodes 423 by using the matrix for the specified volume type. Cluster services node 430 may then use the instruction budgets to allocate processor cycles in one or more DPUs 117 within primary node 421, secondary node 422, and plex nodes 423. Once the allocation is performed, cluster services node 430 may updates the number of processor cycles available in the chosen DPUs 117. When a volume is deleted, cluster services node 430 returns the resources (i.e., processor cycles) allocated to the volume being deleted to the free pool for each of the affected DPUs 117.

Figure 5A:
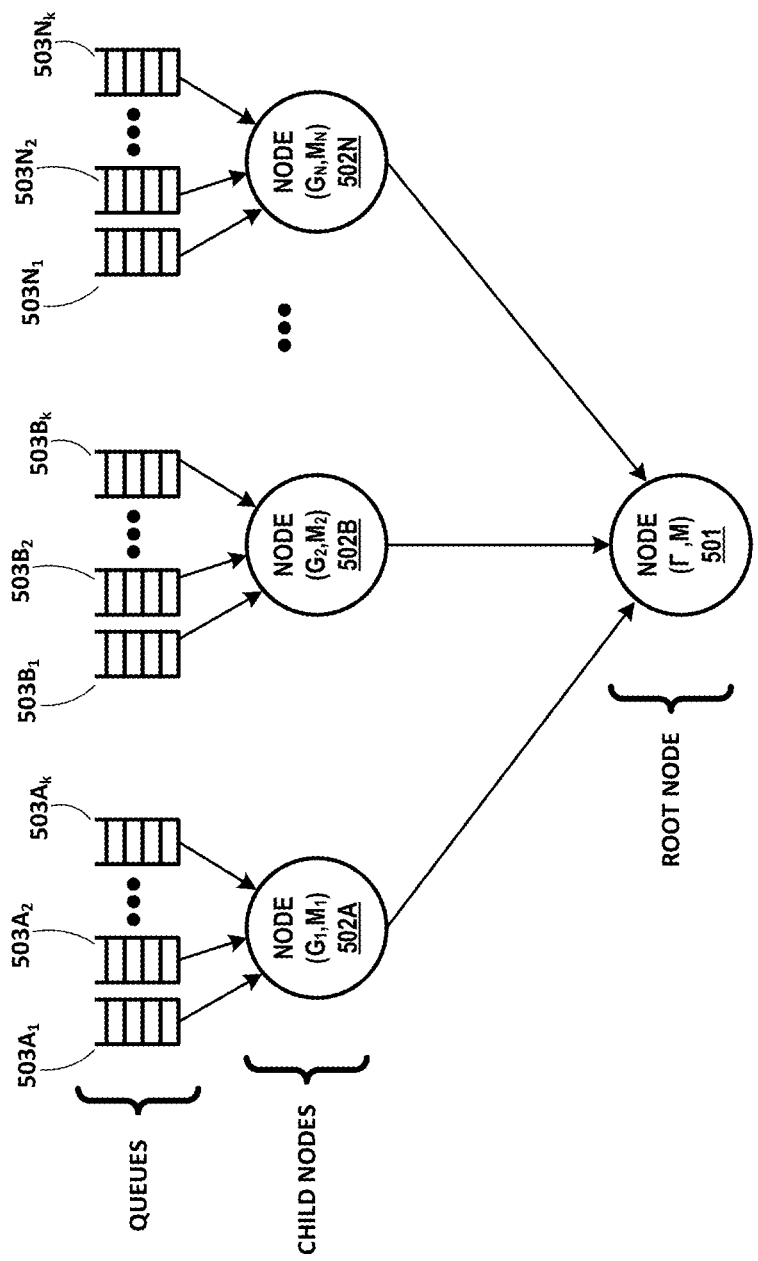
FIG. 5A is a conceptual diagram illustrating a model for scheduling a single resource within an example storage cluster, in accordance with one or more aspects of the present disclosure.

FIG. 5A is a conceptual diagram illustrating a model for scheduling a single resource within an example storage cluster, in accordance with one or more aspects of the present disclosure. FIG. 5A illustrates a multilevel hierarchical tree of resources terminating at a root node, which may be root node 501 shown at the root of the tree. Root node 501 has a number of child nodes 502, and each child node 502 includes one or more queues 503, which themselves may be considered child nodes of child nodes 502 or leaf nodes of the diagram illustrated in FIG. 5A. For example, queues 503A are considered child nodes of child node 502A, queues 503B are considered child nodes of child node 502B, and in general, queues 503N are considered child nodes of child node 502N. Although the tree illustrated in FIG. 5A is drawn with three levels, any number of levels might be used.

Each of queues 503 represents a data structure in which each queue entry represents a demand on a storage cluster resources. As suggested above, since processor cycles or processor resources (e.g., IOPs) are often a bottleneck in a storage cluster, for convenience in FIG. 5A, each queue entry is assumed to be a demand on processor cycles (IOPs) from processors within volume pool 204 of FIG. 2B.

The total number of processor cycles available is represented by two symbols, $\Gamma$ and M, which are associated with root node 501. $\Gamma$ is the number of processor cycles guaranteed to be available at all times, while M is the maximum number available. For ease in illustration and explanation, $\Gamma$ is assumed to be equal to M, although in other examples $\Gamma$ might not be equal to M.

In the example of FIG. 5A, each node in the hierarchy is responsible for allocating its resources, and only its resources, to its children. If root node 501 has ($\Gamma$, M) as guaranteed and maximum resources, and child nodes 502 have Gi and Mi as guaranteed and maximum, the resources associated with root node 501 are considered to be oversubscribed if $\Sigma Gi > \Gamma$ and non-oversubscribed if:

$\Sigma Gi <= \Gamma$

An oversubscription factor may be defined as:

$F \triangleq \Sigma Gi / \Gamma$.

In FIG. 5A, work arrives at the queues at the top of the diagram, with each entry in a queue representing a specific demand on processor cycles. Each child node is free to ask for as much of the resources as it wishes. This ask may be dynamic and might be represented as "$d_i$" herein. The child's parent will distribute its guaranteed resources $\Gamma$ to its children according to an appropriate algorithm, which may be the excess weighted round robin (EWRR) algorithm. Typically, for each level in FIG. 5A, such an algorithm ensures that:

1. It is work conserving: i.e. as long as $\Sigma d_i >= \Gamma$ no resource units are wasted.
2. For $F <= 1$, each child gets minimum($d_i$, $G_i$).
3. For $F > 1$, each child gets minimum($d_i$, $G_i^*$) where $G_i^* = G_i/F$.
4. No child ever gets more resource than its maximum $M_i$.

In some examples, QoS control may be provided at the level of volumes only, and not at the granularity of queues. In such an example, the queues for a given volume may be treated identically. This enables storage cluster 102 to use a single scheduler (e.g., executing the EWRR algorithm) operating at the level of volumes.

Figure 5B:
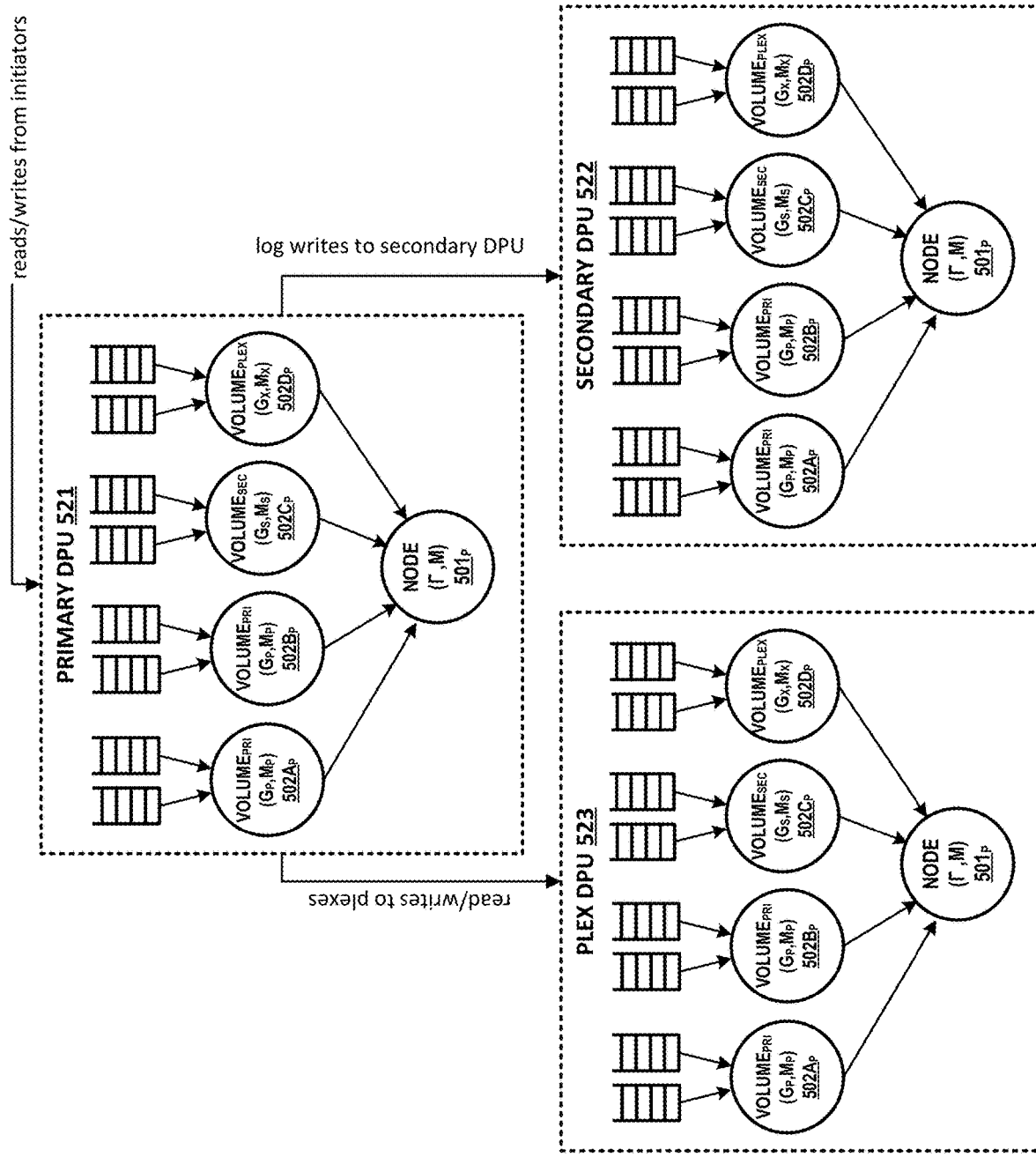
FIG. 5B illustrates a storage data path distributed across physically distinct nodes or data processing units, in accordance with one or more aspects of the present disclosure.

FIG. 5B illustrates a storage data path distributed across physically distinct nodes or data processing units, in accordance with one or more aspects of the present disclosure. In the example shown, each of primary storage DPU 521, secondary storage DPU 522, and plex storage DPU 523 may correspond to one of storage nodes 120 for a given set of volumes. Each of primary storage DPU 521, secondary storage DPU 522, and plex storage DPU 523 serves all three functions (primary, secondary, and plex) on behalf of different volumes. Accordingly, the resources of a given one of the DPUs should be properly accounted for and allocated by controller 130 (see FIG. 1B) and properly scheduled by the QoS processing in the DPU. In the example of FIG. 5B, each of primary storage DPU 521, secondary storage DPU 522, and plex storage DPU 523 have P+2 volume nodes in each DPU, where "P" is the number of volumes for which the DPU acts as the primary DPU (e.g., corresponding to primary storage DPU 521). The other two volume nodes ("+2") represent plex and secondary nodes. Note that in the example shown, there is only one plex node and one secondary node per DPU independent of the number of volumes.

FIG. 5B suggests that the secondary and plex volume functions (e.g., secondary storage DPU 522 and plex storage DPU 523) are deeper in the data path than primary functions. To avoid blockages in the data path, it may be appropriate to provide sufficient resources (e.g., processor cycles) for the secondary and plex volume functions. Otherwise, there is a risk that the primary volume functions could eventually back up and cause an under-utilization of resources and consequently, poor performance. Providing sufficient resources can be accomplished by slightly over-provisioning the guaranteed resources (e.g., processor cycles) "Gs" and "Gx" for these functions. In some examples, it may be appropriate and/or sufficient to over-provision by a factor of 1.1 to 1.5.

In some examples, an implementation of a scheduler/shaper/rate limiter, such as one that may schedule work pursuant to quality of service standards in FIG. 5B, can be broken into three independent processes: (1) an enqueue process, (2) a dequeue process, and a (3) a credit process. One instance of each of these processes may execute on each of the networking processors (e.g., cores 140 allocated to networking pool 202) that participate in managing quality of service compliance. If implementations of the process on each of such cores 140 are identical, the implementation can be described from the point of view of a single networking core 140.

In particular, a data structure may be maintained per volume (where each volume has a quality of service shaper), which may have the form illustrated in the table below:

A queue, such as one of queues 503 illustrated in FIG. 5A, may be used to hold pending transactions for a given QoS index. Such a queue may be indexed by a quality of service index as follows:

pending_q[qos_idx]

In some examples, a 1 bit per QoS index may be used indicate whether or not there are pending transactions with positive active guarantee credits:

g_pending

Also, a 1 bit per QoS index may be used to indicate that there are pending transactions with positive active peak credits ("p_pending"). There may also be a 1 bit per QoS index to indicate whether it is free.

When a volume is created, controller 130 of FIG. 1B may create an instance of the QoS shaper using function having a signature such as that illustrated below. Such a function call will update the respective fields in the QoS data structure of the processor and return the QoS index that is allocated for this volume.

```
qos_idx_t create_volume_qos(g_cdt, p_cdt, p_clip,
    rd_cdt, wr_cdt);
```

The QoS credits may be updated using the below function call whenever there is a need to change the QoS parameters.

```
void update_volume_qos(qos_idx, g_cdt, p_cdt, p_clip,
    rd_cdt, wr_cdt);
```

A QoS shaper may be deleted using a function call having a signature such as that illustrated below:

void delete_volume_qos(qos_idx);

The enqueue process may be implemented such that it is asynchronous to the other two processes (dequeue and credit) and may be triggered when DPU 117 receives a request over the network. The QoS index is determined from the volume index which itself is derived from the queue in which the work arrived. Below is a function to enqueue work to the QoS scheduler; the function outlined below returns true if the volume queues can go forward without stalling, else it returns false and queues the context into the pending queue. In this implementation, the "new_enq" parameter will be true only for enqueues that are not followed by dequeue, to flag whether an enqueue credit check is to be performed.

| Parameter | Width | Description |
|---|---|---|
| | | Static Parameters (in bits) |
| g_cdt | 32 | Guaranteed credits added every time interval. MAX (Guarantee_Read_iops, Guarantee_Write_iops * SSD R/W) |
| p_cdt | 32 | Peak credits added every time interval MAX( Peak_Read_iops, Peak_Write_iops * SSD R/W) |
| p_clip | 32 | Peak credit CLIP (This is to implement burst IOPs) (granularity is IOPs) |
| rd_cdt | 32 | Credits to consume if the operation is a read operation. |
| wr_cdt | 32 | Credits to consume if the operation is a write operation. |
| | | Dynamic Parameters (in bits) |
| active_g_cdt | 32 | Available guaranteed credit in terms of IOPs |
| active_p_cdt | 32 | Available peak credit in terms of IOPs |
| TOTAL | 224 (~32B) | Total volume bits/bytes |

```
bool enqueue(qos_idx, new_enq, context, operation =
   read/write, num_io);
// Determine the credits needed for the enqueue
dec_cdt = (operation == read) ? credit [qos_idx].rd_cdt
   * num_io : credit[qos_idx].wr_cdt * num_io
// If no transactions pending and if the guarantee
   credits are positive, we can proceed further
if ( (new_enq && (pending_q[qos_idx] is empty) or
   (!new_enq && g_pending == 0) ) &&
   credit [qos_idx].active_g_cdt is positive)
{
    credit[qos_idx].active_g_cdt -= dec_cdt
    credit[qos_idx].active_p_cdt -= dec_cdt
    return true
}
// no pending transactions with positive guarantee
   credits and it has peak credits, we can proceed
   further
if ( (new_enq && (g_pending == 0) or (!new_enq
   && p_pending == 0) ) &&
   (pending_q[qos_idx] is empty) &&
   credit[qos_idx].active_p_cdt is positive)
{
    credit [qos_idx] .active_p_cdt -= dec_cdt
    return true
}
// Push the context into a queue if the work cannot be
   admitted into the cluster
push (context, operation, num_io) to
   pending_q[qos_idx]
```

The Dequeue process may be invoked by a timer, and at each epoch, the process dequeues any pending IOPs for the volumes where credits are available:

```
// Return if there are no credits
if(g_pending == 0 && p_pending == 0) {
   return
}
// Dequeue if guarantee credits are available
if (g_pending != 0)
{
   // find the first index from g_last_idx that is
   non_zero that is denoted by g_idx
   tran = pop the head entry from pending_q[g_idx]
   dec_cdt = (tran.operation == read) ?
   credit[g_idx].rd_cdt * tran.num_io :
   credit[g_idx].wr_cdt * num_io
   credit[g_idx].active_g_cdt -= dec_cdt
   credit[g_idx].active_p_cdt -= dec_cdt
   if(credit[g_idx].active_g_cdt is negative ||
   (pending_q[g_idx] is empty) )
       g_pending[g_idx] = 0
   if(credit[g_idx].active_p_cdt is negative ||
   (pending_q[g_idx] is empty) )
       p_pending[g_idx] = 0
   g_last_idx = g_idx
   deque_callback(tran.context, tran.num_io)
}
// Dequeue if peak credits are available
else if (p_pending != 0)
{
   find the first index from p_last_idx that is
   non zero that is denoted by p_idx
   tran = pop the head entry from pending_q[p_idx]
   dec_cdt = (tran.operation == read) ?
   credit[p_idx].rd_cdt * tran.num_io :
credit[g_idx].wr_cdt * num_io
   credit[p_idx].active_p_cdt -= dec_cdt
   if(credit[p_idx].active_p_cdt is negative ||
   (pending_q[p_idx] is empty) )
       p_pending[p_idx] = 0
   p_last_idx = p_idx
   deque_callback(tran.context, tran.num_io)
}
```

The credit process may be triggered by a timer and in general, is responsible for updating the active credits. The interval between timer events should be chosen carefully to satisfy two competing contraints. The first constraint is that the granularity of credit increments be as small as possible to ensure smooth behavior for each queue. This requires the timer interval to be small. The second constraint is that the number of networking VP cycles spent by this process be a small fraction (e.g., <10%) of the total networking VP cycles available.

```
Initialize update_idx = 0
// check that it does not overflow
credits[update_idx].active_g_cdt +=
credits[update_idx].g_cdt
// clamp the guarantee
credits[update_idx].active_p_cdt +=
credits[update_idx].p_cdt
if( (credits[update_idx].active_p_cdt overflow) or
   (credits[update_idx].active_p_cdt >
   credits[update_idx].p_clip) )
{
   credits[update_idx].active_p_cdt =
   credits[update_idx].p_clip
}
if(credits[update_idx].active_g_cdt is positive &&
   pending_q[qos_idx] is not empty) {
      g_pending[update_idx] = 1
}
if(credits[update_idx].active_p_cdt is positive &&
   pending_q[qos_idx] is not empty) {
      p_pending[update_idx] = 1
}
update_idx++
// if done with all the qos indexes then wrap back to
   0
if(update_idx == last_idx) update_idx = 0
```

In one example of computing the timer interval for the credit process, each processor can be assumed to process 600M instructions per second. One percent of this budget is 6M instructions per second. Assuming 512 volumes per processor, that translated into 12K instructions per volume-second. If each pass takes 100 instructions per volume and 200 instructions for the queues in the volume, the number of passes in 1 second for supporting 12K volumes is 40 (=12000/300). In such an example, the timer interval may be chosen to be 25 milliseconds.

For mixed workloads involving both read and write operations, the QoS that is guaranteed will be somewhere between the read QoS guaranteed and the write QoS guarantee. Calculating the specific QoS guarantee may be performed by using a ratio of expected reads to writes in the workload, and applying that ratio to the read and write QoS guarantees. In an example using a single shaper per volume, with credits equal to maximum of the read and write QoS guarantees, the credit may be decremented by 1 for every read and the credit may be decremented by 1*RG/WG (ratio of read/write guarantees). Such an example may assume the read QoS guarantee is higher than write QoS guarantee, which is usually the case since the total IOPs available from a typical SSDs is consistent with that assumption. Using such a calculation ensures that the QoS shaper provides RG when the workload is read-only, WG when the workload is write-only, and an allocation of resources in between RG and WG for mixed workloads, where the specific allocation may depend on the ratio of reads to writes in the IO demand. A similar application of this logic can be used for the credits used for enforcing QoS maximum limits.

In some examples, initiator node 110 and storage node 120 may rate limit demand for resources through queue sizing. For instance, in an example that can be described with reference to FIG. 1B, initiator node 110 may discovery capabilities of a target storage node 120 when establishing a connection with that storage node 120 using NVMe protocol. Such information may include information about the number of queues and queue depth for storage nodes 120. A maximum QoS value associated with a given storage node 120 may be included in the capabilities reported by the storage node 120 and this information may be used to achieve coarse level rate limiting at initiator node 110. In some examples, storage node 120 may take a worst case latency from initiator node 110 into account when reporting the number of queues supported and the queue depth of each of such queues.

Further, in some examples, storage node 120 may also rate limit demand for resources through TCP window size configurations. For instance, again in an example that can be described with reference to FIG. 1B, storage node 120 may use TCP protocol tuning to limit the maximum IO rate from any initiator node 110 with which it interacts. Storage node 120 may choose a TCP window size based on a maximum QoS and worst case end-to-end latency, and thereby limit the demand from storage node 120. Such a process may also limit the buffering needed to be performed by storage node 120.

In some examples, each of DPUs 117 may be capable of pipeline processing with zero stalls for data processing using tight integration between hardware and software. DPUs 117 may be capable of processing units of work (i.e., "work units") in a run-to-completion model by a processor without any stalls or interruptions. A storage pipeline may be a set of work units, with each work unit executed on a different processor (or virtual processor) for processing the IOPs associated with a volume. An example pipeline of work units for a raw (i.e., ephemeral) volume may take the form of:

TCP↔NVMe over Fabrics↔Raw Volume↔Backend NVMe Driver

A durable volume, which provides additional functionality of log structuring and erasure coding/replication, may add additional stages to the pipeline. Parallel work units may also be executed in forks and joins. Similarly, additional features like encryption, compression, and deduplication might add more stages to the pipeline. Further details about work units and pipeline processing may be found in U.S. Pat. No. 10,841,245, filed Nov. 20, 2018, entitled "WORK UNIT STACK DATA STRUCTURES IN MULTIPLE CORE PROCESSOR SYSTEM FOR STREAM DATA PROCESSING," and U.S. Pat. No. 10,929,175, entitled "SERVICE CHAINING HARDWARE ACCELERATORS WITHIN A DATA STREAM PROCESSING INTEGRATED CIRCUIT", filed Nov. 21, 2018. These publications are hereby incorporated by reference.

Generally, there is a state associated with most of the stages of a storage pipeline and so relying on locking procedures that require overhead and/or context switches is not optimal. Therefore, processor or virtual processor may use serialization (serializing the state updates on a given processor) to perform state updates. As a result, an allocation/placement algorithm may be used to place the storage pipelines of each volume among the processors. Such allocation/placement may be performed by accounting for the QoS parameters of each volume. This allocation logic may take various factors into consideration in choosing processors (or DPUs 117) for a storage pipeline (of a volume). The processors for the storage pipeline of a volume requiring a given QoS may be selected by converting the QoS into CPU load in processor cycles or IOPs and checking the current load on the processors.

This allocation/placement problem is similar to the bin packing problem, and to solve this problem, the following considerations may be used:

(1) Cluster Proximity: each of DPUs 117 may have multiple processing clusters with each cluster comprising a number of CPU cores and each core comprising of a number of VPs (Virtual Processors). Cluster proximity may be used when selecting VPs for a given pipeline to avoid any cache miss stalls and also get the benefit of latency in accessing the cluster's local resources.

(2) Pick Mostly Loaded Cluster First: the utilization of a processing cluster may be maximized before allocating a different cluster.

(3) Pick Least Loaded Core First: CPU cores may be selected within a cluster in a way that maximizes performance; this may require uniform spreading of the load.

A cost table, which may be statically populated based on performance data, can be used to represent the VP cycles required to service a given stage of the pipeline for a single IO operation. The cost data for both read and write operations are available if the system supports independent configuration of read and write QoS, as described herein. Use the maximum of costs of read QoS and write QoS can be used for reserving VP cycles. The VP allocation algorithm for a given pipeline may first select the mostly loaded cluster where the pipeline will fit and then may select the least loaded core. Once a core is selected for a stage of the pipeline (where a given work unit handler in the pipeline runs), a VP within that core may be allocated based on the least loaded VP.

Scheduling in the networking VPs (i.e., networking pool 202 of FIG. 2B) generally ensures no more work is admitted than what a given DPU 117 can handle. Further, VP allocation for storage pipelines (volumes) may ensure that pipelines are allocated without any conflict. Note that the pipeline VP allocation within a DPU may be initially performed at the volume creation time but may also be adjusted dynamically at the time a volume is active. The dynamic relocation of a volume's pipeline when it is becoming active may be performed pursuant to the following steps:

1. Start queueing incoming work at the TCP or NVMe over Fabrics layer. Eventually, this might back pressure the Initiator if relocation is not quick.
2. Make sure there is no pending work by flushing all stages of the volume pipeline.
3. Make sure all the completions are processed as well (wait for completions to match submissions).
4. Change the VP allocation of volume pipeline.
5. Start processing queued traffic, so the Initiator can resume if it was back-pressured.

Figure 6:
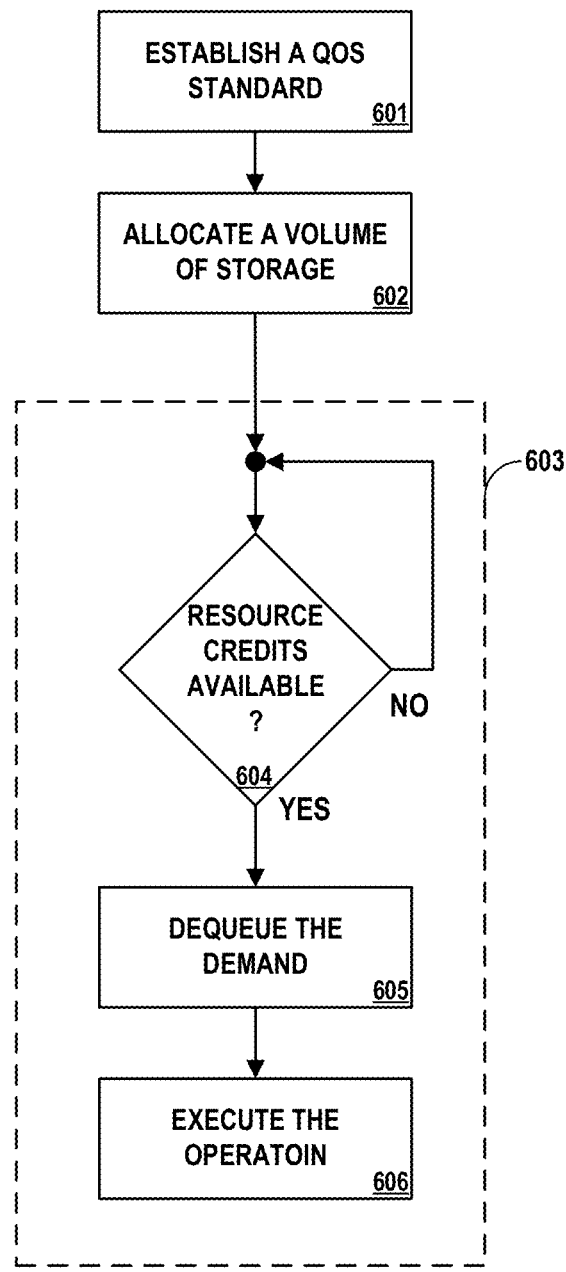
FIG. 6 is a flow diagram illustrating operations performed by an example storage cluster in accordance with one or more aspects of the present disclosure.

FIG. 6 is a flow diagram illustrating operations performed by an example storage cluster in accordance with one or more aspects of the present disclosure. FIG. 6 is described below within the context of storage cluster 102 of FIG. 1B. In other examples, operations described in FIG. 6 may be performed by one or more other components, modules, systems, or devices. Further, in other examples, operations described in connection with FIG. 6 may be merged, performed in a difference sequence, omitted, or may encompass additional operations not specifically illustrated or described.

In the process illustrated in FIG. 6, and in accordance with one or more aspects of the present disclosure, storage cluster 102 may establish a quality of service standard for each of a plurality of tenants sharing a storage resource provided by the plurality of storage nodes in the storage cluster, wherein the quality of service standard includes a guaranteed allocation of the storage resource for each of the plurality of tenants and a maximum allocation of the storage resource for each of the plurality of tenants (601). For example, with reference to FIG. 1B, controller 130 may detect input that it determines corresponds to input about service level agreement that specifies, for one or more tenants of storage cluster 102, a set of standards that outline performance, availability, or capacity expectations associated with services provided by storage cluster 102 to such tenants. In some examples, the set of standards may specify a guaranteed allocation of performance, availability, capacity, or other metric or attribute for a given resource within storage cluster 102. Further, the set of standards may specify a maximum allocation of performance, availability, capacity, or other metric or attribute for the given resource.

Storage cluster 102 may allocate a volume of storage within the storage cluster by identifying a set of storage nodes to provide the storage resource for the volume of storage, wherein the set of storage nodes are a subset of the plurality of storage nodes (602). For example, again with reference to FIG. 1B, storage services module 131 of controller 130 determines, based on input or otherwise, that a new volume (e.g., volume 121J) is to be created for a specific tenant of storage cluster 102 (e.g., tenant "J"). Storage services module 131 further determines the type of volume to be allocated and attributes of volume 121J (e.g., compressed, encrypted, durable). Storage services module 131 accesses data store 132 and uses a best fit algorithm to identify storage nodes 120 to be allocated to volume 121J. In one specific example, storage services module 131 determines that new volume 121J is to be allocated using resources from storage nodes 120A, 120B, and 120D. Storage services module 131 causes controller 130 to allocate volume 121J.

Storage cluster 102 may schedule an operation to be performed by the set of storage nodes for the volume of storage (603). For example, still referring to FIG. 1B, one or more of the storage nodes 120 allocated to volume 121J, such as storage node 120A, detects input that it determines corresponds to work associated with an operation to be performed on volume 121J. Storage node 120A further determines that the work requires use of one or more resources of DPU 117A and/or storage node 120A in order to complete the work (e.g., where storage node 120A has been allocated to volume 121J). Storage node 120A enqueues the work and waits until sufficient credits are available for the resource(s) needed (NO path from 604). Once sufficient resources are available, storage node 120A dequeues the work (605 and YES path from 604). In connection with dequeuing the work, storage node 120A enables DPU 117A to execute and/or perform the work (606).

Various examples, descriptions, attributes, features, and/or techniques in accordance with one or more aspects of this disclosure are outlined in the clauses below.

Clause 1: A method of achieving guaranteed and adaptive quality of service (QoS) in a scale out and disaggregated storage cluster. Such a method may comprise one or more DPU-based storage target nodes with attached SSDs, zero or more DPU powered storage initiator nodes, and one or more storage controller nodes for storage management and orchestration (i.e., cluster services).

Clause 2: The method of any other clause, wherein the storage orchestration system uses a best-fit algorithm for allocating the cluster resources (SSDs, DPUs, and network bandwidth) to the volumes based on QoS requirements and a current allocation of the existing volumes and other factors like fault zones and SSD wear leveling.

Clause 3: The method of any other clause, wherein the incoming work is scheduled by using Excessive Weighted Round Robin (EWRR) algorithm that provides guaranteed QoS of each active volume and also allows each volume to get up to maximum QoS by sharing unused resources among the active volumes.

Clause 4: The method of any other clause, where the internal processor resources of a DPU are managed as three separate groups for network, volume, and SSD driver functions in order to ensure that volume function becomes the first bottleneck.

Clause 5: The method of any other clause, wherein multiple NVMe queues belonging to a volume are rate limited together using a single rate limiter.

Clause 6: The method of any other clause, including allowing rate limiting in a hierarchical fashion to achieve QoS of an aggregated volume group at one level and QoS of individual volumes within a volume group at the next level.

Clause 7: The method of any other clause, including segregating the new work from inter DPU to DPU traffic, including traffic received by a DPU for journal replication and inter DPU traffic for durability, and prioritize the new work without being subject to any rate limiting or QoS policies in order to ensure that the minimum QoS is met even for volumes spanning multiple DPUs.

Clause 8: The method of any other clause, including supporting and/or configuring independent QoS parameters for read-only and write-only workloads and providing the QoS for mixed workloads based on the configured read-only and write-only QoS parameters and the ratio of read to write traffic in the mixed workload.

Clause 9: The method of any other clause, wherein the incoming work of volumes is rate limited to maximum QoS by restricting the number of NVMeoF Queues (NVMe/TCP Queues when using TCP as the transport) and queue depth of the queues based on the maximum QoS parameters.

Clause 10: The method of any other clause, wherein the TCP Receive Window Size is configured based on the maximum QoS when using NVMe/TCP.

Clause 11: The method of any other clause, wherein the internal resources of a DPU, like processing cycles (e.g., VP cycles), are allocated based on QoS requirements.

Clause 12: The method of any other clause, where the storage software functionality in a DPU is realized as a pipeline of work unit handlers is dynamically moved across the processor resources when a new active volume contends with other active volumes for resources within a DPU.

Clause 13: The method of any other clause, including allowing oversubscription of the QoS of the cluster and relocate the volumes across DPUs when a DPU cannot meet the QoS of all the active volumes.

Clause 14: The method of any other clause, where the QoS degrades for all volumes adaptively when a cluster is oversubscribed.

Clause 15: A system comprising means for performing any of the methods of any prior clause.

Clause 16: A system or computing device comprising means for performing any of the methods of any prior clause.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are each hereby incorporated by reference in their entireties. To the extent that any such disclosure material that is incorporated by reference conflicts with the instant disclosure, the instant disclosure shall control.

For ease of illustration, only a limited number of devices (e.g., initiator nodes 110, storage nodes 120, controllers 130, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   establishing, by a storage cluster having a plurality of storage nodes, a quality of service standard for each of a plurality of tenants sharing a storage resource, wherein the quality of service standard includes a guaranteed allocation of the storage resource for the tenant and a maximum allocation of the storage resource for the tenant, wherein the quality of service standards for the plurality of tenants allow for oversubscription where utilization of the storage resource can exceed 100%, and wherein the storage resource is provided by the plurality of storage nodes in the storage cluster;
   allocating, by the storage cluster and based on the quality of service standards, a plurality of volumes of storage within the storage cluster, wherein allocating a volume of the plurality of volumes of storage includes identifying a set of storage nodes to provide the storage resource for the volume of storage, and wherein the set of storage nodes are a subset of the plurality of storage nodes;
   upon detecting that utilization of the storage resource is above a predetermined threshold, moving one or more of the plurality of volumes to address a risk that the quality of service standards for the plurality of tenants are not satisfied;
   scheduling, by the storage cluster and based on the quality of service standards, operations to be performed by the set of storage nodes for a given volume of storage, wherein scheduling operations includes:
      enqueuing, within a first storage node in the set of storage nodes, a plurality of demands to use the storage resource provided by the first storage node;
      maintaining a credit count associated with the plurality of demands;
      periodically increasing the credit count over time;
      dequeuing, based on the increased credit count, one of the plurality of demands to enable an operation to be performed by a data processing unit of the first storage node; and
      after the dequeuing, decreasing the credit count; and
      executing the enabled operation to be performed by the data processing unit of the first storage node associated with the dequeued one of the plurality of demands.

2. The method of claim 1, wherein establishing the quality of service standard includes:
   establishing, for a first operation type, a first guaranteed allocation of the storage resource for operations of the first operation type for the tenant;
   establishing, for the first operation type, a first maximum allocation of the storage resource for operations of the first operation type for the tenant;
   establishing, for a second operation type, a second guaranteed allocation of the storage resource for operations of the second operation type for the tenant; and
   establishing, for the second operation type, a second maximum allocation of the storage resource for operations of the second operation type for the tenant.

3. The method of claim 1, wherein establishing the quality of service standard includes:
   establishing, for read operations, a guaranteed allocation of the storage resource for read operations for the tenant and a maximum allocation of the storage resource for read operations for the tenant; and
   establishing, for write operations, a guaranteed allocation of the storage resource for write operations for the tenant and a maximum allocation of the storage resource for write operations for the tenant.

4. The method of claim 1, wherein the storage resource is a first storage resource, wherein each of the plurality of tenants share the first storage resource and a second storage resource in the storage cluster, and wherein establishing the quality of service standard includes:
   establishing a guaranteed allocation of the second storage resource for the tenant; and
   establishing a maximum allocation of the second storage resource for the tenant.

5. The method of claim 1, wherein the storage resource includes at least one of:
   storage capacity, input/output processing cycles, bandwidth, processor processing cycles, or accelerator resources.

6. The method of claim 1, wherein allocating the volume of the plurality of volumes of storage includes:
   maintaining a count associated with the storage resource across the plurality of storage nodes in the storage cluster; and
   adjusting the count based on identifying the set of storage nodes to provide the storage resource for the volume of storage.

7. The method of claim 1, the method further comprising:
   deallocating, by the storage cluster, the volume of the plurality of volumes of storage, wherein deallocating the volume includes making at least some resources associated with the set of storage nodes for the volume available to be allocated to a new volume of storage.

8. The method of claim 1, wherein the plurality of tenants includes a first tenant and a second tenant, the method further comprising:
   establishing a first guaranteed allocation of the storage resource for the first tenant, and a first maximum allocation of the storage resource for the first tenant; and
   establishing a second guaranteed allocation of the storage resource for the second tenant, and a second maximum allocation of the storage resource for the second tenant, wherein the first guaranteed allocation is different than the second guaranteed allocation.

9. The method of claim 8,
wherein the first maximum allocation is different than the second maximum allocation.

10. A storage cluster comprising:
a network; and
a plurality of computing systems, at least one of the computing systems comprising one or more processors, each interconnected over the network, wherein the plurality of computing systems includes a plurality of storage nodes comprising one or more storage machines, and wherein the plurality of computing systems are collectively configured to:
establish a quality of service standard for each of a plurality of tenants sharing a storage resource, wherein the quality of service standard includes a guaranteed allocation of the storage resource for the tenant and a maximum allocation of the storage resource for the tenant, wherein the quality of service standards for the plurality of tenants allow for oversubscription where utilization of the storage resource can exceed 100%, and wherein the storage resource is provided by the plurality of storage nodes in the storage cluster;
allocate, based on the quality of service standards, a plurality of volumes of storage within the storage cluster, wherein allocating a volume of the plurality of volumes of storage includes identifying a set of storage nodes to provide the storage resource for the volume of storage, and wherein the set of storage nodes are a subset of the plurality of storage nodes;
upon detecting that utilization of the storage resource is above a predetermined threshold, move one or more of the plurality of volumes to address a risk that the quality of service standards for the plurality of tenants are not satisfied;
schedule, based on the quality of service standards, operations to be performed by the set of storage nodes for a given volume of storage, wherein scheduling operations includes:
enqueuing, within a first storage node in the set of storage nodes, a plurality of demands to use the storage resource provided by the first storage node;
maintaining a credit count associated with the plurality of demands;
periodically increasing the credit count over time;
dequeuing, based on the increased credit count, one of the plurality of demands to enable an operation to be performed by a data processing unit of the first storage node; and
after the dequeuing, decreasing the credit count; and
execute the enabled operation to be performed by the data processing unit of the first storage node associated with the dequeued one of the plurality of demands.

11. The storage cluster of claim 10, wherein to establish the quality of service standard, the computing systems are further configured to:
establish, for a first operation type, a first guaranteed allocation of the storage resource for operations of the first operation type for the tenant;
establish, for the first operation type, a first maximum allocation of the storage resource for operations of the first operation type for the tenant;
establish, for a second operation type, a second guaranteed allocation of the storage resource for operations of the second operation type for the tenant; and
establish, for the second operation type, a second maximum allocation of the storage resource for operations of the second operation type for the tenant.

12. The storage cluster of claim 10, wherein to establish the quality of service standard, the computing systems are further configured to:
establish, for read operations, a guaranteed allocation of the storage resource for read operations for the tenant and a maximum allocation of the storage resource for read operations for the tenant; and
establish, for write operations, a guaranteed allocation of the storage resource for write operations for the tenant and a maximum allocation of the storage resource for write operations for the tenant.

13. The storage cluster of claim 10, wherein the resource is a first storage resource, wherein each of the plurality of tenants share the first storage resource and a second storage resource in the storage cluster, and wherein to establish the quality of service standard, the computing systems are further configured to:
establish a guaranteed allocation of the second storage resource for the tenant; and
establish a maximum allocation of the second storage resource for the tenant.

14. The storage cluster of claim 10, wherein the storage resource includes at least one of:
storage capacity, input/output processing cycles, bandwidth, processor processing cycles, or accelerator resources.

15. The storage cluster of claim 10, wherein to allocate the volume of the plurality of volumes of storage, the computing systems are further configured to:
maintain a count associated with the storage resource across the plurality of storage nodes in the storage cluster; and
adjust the count based on identifying the set of storage nodes to provide the storage resource for the volume of storage.

16. The storage cluster of claim 10, wherein the computing systems are further configured to:
deallocate the volume of the plurality of volumes of storage, wherein deallocating the volume includes making at least some resources associated with the set of storage nodes for the volume available to be allocated to a new volume.

17. The storage cluster of claim 10, wherein the plurality of tenants include a first tenant and a second tenant, and wherein to establish the quality of service standard, the computing systems are further configured to:
establish a first guaranteed allocation of the storage resource for the first tenant, and a first maximum allocation of the storage resource for the first tenant; and
establish a second guaranteed allocation of the storage resource for the second tenant, and a second maximum allocation of the storage resource for the second tenant,
wherein the first guaranteed allocation is different than the second guaranteed allocation.

18. A storage cluster comprising processing circuitry and a system for storing computing instructions, wherein the processing circuitry has access to the system for storing computing instructions and is configured to:
establish a quality of service standard for each of a plurality of tenants sharing a storage resource, wherein the quality of service standard includes a guaranteed allocation of the storage resource for the tenant and a maximum allocation of the storage resource for the tenant, wherein the quality of service standards for the plurality of tenants allow for oversubscription where utilization of the storage resource can exceed 100%, and wherein the storage resource is provided by the plurality of storage nodes in the storage cluster;

allocate, based on the quality of service standards, a plurality of volumes of storage within the storage cluster, wherein allocating a volume of the plurality of volumes of storage includes identifying a set of storage nodes to provide the storage resource for the volume of storage, and wherein the set of storage nodes are a subset of the plurality of storage nodes;

upon detecting that utilization of the storage resource is above a predetermined threshold, move one or more of the plurality of volumes to address a risk that the quality of service standards for the plurality of tenants are not satisfied;

schedule, based on the quality of service standard, operations to be performed by the set of storage nodes for a given volume of storage, wherein scheduling operations includes:

enqueuing, within a first storage node in the set of storage nodes, a plurality of demands to use the storage resource provided by the first storage node;

maintaining a credit count associated with the plurality of demands;

periodically increasing the credit count over time;

dequeuing, based on the increased credit count, one of the plurality of demands to enable an operation to be performed by a data processing unit of the first storage node; and after the dequeuing, decreasing the credit count; and execute the enabled operation to be performed by the data processing unit of the first storage node associated with the dequeued one of the plurality of demands.

* * * * *